US011263889B2

(12) United States Patent
Frascati-Robinson et al.

(10) Patent No.: US 11,263,889 B2
(45) Date of Patent: *Mar. 1, 2022

(54) SYSTEMS AND METHODS FOR SYSTEMIC RESOURCE UTILIZATION ANALYSIS AND MANAGEMENT

(71) Applicant: The Travelers Indemnity Company, Hartford, CT (US)

(72) Inventors: Aasta Frascati-Robinson, Amston, CT (US); Michael R. Gammon, Canton, CT (US); Paul R. Langdon, Wethersfield, CT (US); Robert O'Connor, Harwinton, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,133

(22) Filed: May 8, 2020

(65) Prior Publication Data

US 2020/0265703 A1    Aug. 20, 2020

Related U.S. Application Data

(63) Continuation of application No. 16/381,176, filed on Apr. 11, 2019, now Pat. No. 10,679,485, which is a continuation of application No. 15/473,579, filed on Mar. 29, 2017, now Pat. No. 10,282,966.

(51) Int. Cl.
*G08B 21/18* (2006.01)
*G06Q 40/08* (2012.01)
*G08B 31/00* (2006.01)
*G08B 25/08* (2006.01)

(52) U.S. Cl.
CPC .......... *G08B 21/182* (2013.01); *G06Q 40/08* (2013.01); *G08B 25/08* (2013.01); *G08B 31/00* (2013.01)

(58) Field of Classification Search
None
See application file for complete search history.

(56) References Cited

U.S. PATENT DOCUMENTS

| 8,347,427 | B2 | 1/2013 | Klicpera | |
|---|---|---|---|---|
| 8,457,088 | B1 * | 6/2013 | Bidichandani | H04W 4/80 370/338 |
| 8,619,730 | B2 * | 12/2013 | Quigley | H04W 36/0072 370/338 |
| 8,887,324 | B2 | 11/2014 | Klicpera | |
| 8,922,379 | B1 * | 12/2014 | Meyer | G08B 21/20 340/605 |
| 8,976,795 | B2 * | 3/2015 | Kuehnel | H04W 84/18 370/395.3 |

(Continued)

OTHER PUBLICATIONS

Notice of Allowance for U.S. Appl. No. 15/473,579 dated Nov. 22, 2017; 11 pps.

(Continued)

*Primary Examiner* — Fekadeselassie Girma
(74) *Attorney, Agent, or Firm* — RowanTree Law Group, PLLC; Carson C. K. Fincham

(57) ABSTRACT

Systems, methods, and articles of manufacture provide for systemic resource utilization analysis and management, such as employing a single-point sensor to detect or identify resource leakage at one or more other locations in a structure.

18 Claims, 10 Drawing Sheets

(56) References Cited

U.S. PATENT DOCUMENTS

| | | | |
|---|---|---|---|
| 9,178,632 B2* | 11/2015 | Grob | H04H 60/31 |
| 9,297,150 B2 | 3/2016 | Klicpera | |
| 9,351,124 B1* | 5/2016 | Shelton | G01S 5/0252 |
| 9,360,874 B2* | 6/2016 | Imes | G05D 23/1919 |
| 9,382,389 B2 | 7/2016 | Meyer | |
| 9,383,289 B1* | 7/2016 | Meyer | G01M 3/16 |
| 9,494,480 B2 | 11/2016 | Klicpera | |
| 9,692,538 B2* | 6/2017 | Tyson | H04W 56/00 |
| 9,713,084 B2* | 7/2017 | Skeoch | H04W 52/0216 |
| 9,749,792 B2 | 8/2017 | Klicpera | |
| 9,779,615 B2 | 10/2017 | Davell et al. | |
| 9,857,805 B2 | 1/2018 | Halimi | |
| 10,282,966 B2* | 5/2019 | Frascati-Robinson | G08B 21/182 |
| 10,352,814 B2 | 7/2019 | Enev et al. | |
| 10,410,501 B2 | 9/2019 | Klicpera | |
| 10,428,495 B2 | 10/2019 | Halimi | |
| 10,506,307 B2 | 12/2019 | Adler et al. | |
| 10,527,516 B2 | 1/2020 | Banerjee et al. | |
| 10,679,485 B2* | 6/2020 | Frascati-Robinson | G08B 25/08 |
| 10,750,253 B2 | 8/2020 | Adler et al. | |
| 10,830,664 B2 | 11/2020 | Kent et al. | |
| 10,837,160 B2 | 11/2020 | Hammond et al. | |
| 10,865,546 B2 | 12/2020 | Hammond et al. | |
| 10,866,601 B2 | 12/2020 | Halimi | |
| 10,870,970 B2 | 12/2020 | Hammond et al. | |
| 10,935,455 B2 | 3/2021 | Bannerjee et al. | |
| 10,962,439 B2 | 3/2021 | Enev et al. | |
| 11,095,960 B2 | 8/2021 | Klicpera | |
| 2008/0291855 A1* | 11/2008 | Bata | H04W 84/18 370/311 |
| 2010/0076835 A1* | 3/2010 | Silverman | G06Q 30/02 705/14.33 |
| 2010/0188206 A1* | 7/2010 | Kates | G08B 19/00 340/521 |
| 2010/0262882 A1* | 10/2010 | Krishnamurthy | H04L 1/1809 714/748 |
| 2012/0026004 A1* | 2/2012 | Broniak | E03B 7/075 340/870.02 |
| 2013/0159030 A1* | 6/2013 | Tattenbaum | G06Q 10/02 705/5 |
| 2014/0132772 A1* | 5/2014 | Billau | H04N 7/18 348/159 |
| 2014/0160926 A1* | 6/2014 | Gage | H04W 74/0833 370/235 |
| 2015/0178761 A1* | 6/2015 | O'Connor | G06Q 30/0226 705/14.27 |
| 2015/0350867 A1* | 12/2015 | Chaponniere | H04W 40/04 370/254 |
| 2016/0242229 A1* | 8/2016 | Balachandran | H04W 4/70 |
| 2016/0364685 A1* | 12/2016 | Wass | G06Q 10/30 |
| 2017/0131174 A1 | 5/2017 | Enev et al. | |
| 2017/0159267 A1 | 6/2017 | Halimi | |
| 2017/0281060 A1* | 10/2017 | Wedekind | A61B 5/0022 |
| 2018/0127957 A1 | 5/2018 | Enev et al. | |
| 2018/0136673 A1 | 5/2018 | Halimi | |
| 2018/0259982 A1 | 9/2018 | Halimi | |
| 2018/0286210 A1* | 10/2018 | Frascati-Robinson | G06Q 40/08 |
| 2020/0264068 A1 | 8/2020 | McCarthy et al. | |
| 2020/0265703 A1* | 8/2020 | Frascati-Robinson | G08B 25/08 |
| 2020/0370991 A1 | 11/2020 | Banerjee et al. | |
| 2021/0011500 A1 | 1/2021 | Halimi et al. | |

OTHER PUBLICATIONS

Notice of Allowance for U.S. Appl. No. 15/473,579 dated Dec. 6, 2017; 4 pps.

Notice of Allowance for U.S. Appl. No. 15/473,579 dated Apr. 10, 2018; 7 pps.

Notice of Allowance for U.S. Appl. No. 15/473,579 dated Sep. 17, 2018; 7 pps.

Notice of Allowance for U.S. Appl. No. 15/473,579 dated Dec. 31, 2018; 7 pps.

Office Action for U.S. Appl. No. 16/381,176 dated Sep. 25, 2019; 7 pps.

Notice of Allowance for U.S. Appl. No. 16/381,176 dated Feb. 5, 2020; 9 pps.

* cited by examiner

SYSTEMS AND METHODS FOR SYSTEMIC RESOURCE UTILIZATION ANALYSIS AND MANAGEMENT

CROSS-REFERENCE TO RELATED APPLICATIONS

The present application claims benefit and priority to, and is a Continuation of, U.S. patent application Ser. No. 16/381,176 filed on Apr. 11, 2019 and titled "SYSTEMS AND METHODS FOR SYSTEMIC RESOURCE UTILIZATION ANALYSIS AND MANAGEMENT", which issued as U.S. patent Ser. No. 10/679,485, on Jun. 29, 2020, which itself claims benefit and priority to and is a Continuation of U.S. patent application Ser. No. 15/473,579 filed on Mar. 29, 2017 and titled "SYSTEMS AND METHODS FOR SYSTEMIC RESOURCE UTILIZATION ANALYSIS AND MANAGEMENT", which issued as U.S. patent Ser. No. 10/282,966, on May 7, 2019, the contents of each of which are hereby incorporated by reference herein

BACKGROUND

Various structures, such as commercial, industrial, and residential buildings, are typically conduits for various consumable utilities or resources. Many buildings, for example, are connected to a public potable water supply and utilize internal plumbing networks to distribute the water from the supply to multiple locations within the building. Leaks in the plumbing are well known to cause significant damage and are also an economical and environmental waste. Typical efforts to detect plumbing leaks involve moisture sensors placed in areas of suspected higher likelihood of leakage, such as near washing machines and hot water heaters. These sensors, however, are limited to detection in their immediate area of installation and are typically only effective at detecting significant failure events (e.g., a burst pipe).

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Utilities or consumable resources such as potable water, gas, electricity, and oil are often critical to the desired functionality of most man-made structures. Particularly for fluid resources, such as water and gas, however, the conduits that carry the resources for distribution and usage are prone to failures that result in leaks. In some cases, leaks result from a catastrophic point or localized failure of a resource delivery system, such as a domestic water supply pipe. In other cases, leaks may be smaller or more chronic in nature, such as a pin-hole in a pipe, a dripping faucet, or a phantom electrical load. Large leaks can cause significant damage to a structure or the contents thereof, mandate structure evacuation, or even cause bodily harm or loss of life (such as in the case of gas line failure). Smaller leaks may also cause damage, but more typically are exemplified by resource waste and associated economic loses over longer periods of time (e.g., higher monthly electric or water bills).

Previous efforts to detect resource losses or leakage have concentrated on large leaks that occur at specific points of likely failure—such as adjacent to a washing machine where washing machine supply hoses are well known to suffer failures that result in water damage to the inside of residential structures. Accordingly, any leaks (large or small) or failures that occur elsewhere in a resource distribution system are not properly detected.

In accordance with embodiments herein, these and other deficiencies of previous efforts are remedied, such as by providing systems, apparatus, methods, and articles of manufacture for systemic resource utilization analysis and management. In some embodiments, for example, a resource sensor may be coupled to or disposed at a single point in a structure, such as at a water or gas main, sewer outflow, or main air duct (supply or return). Data received from the sensor may be analyzed, such as by utilizing a classification algorithm in some embodiments, to determine whether resource usage is indicative of a leak somewhere in the structure. According to some embodiments, alerts may be provided and/or a valve may be closed in response to a detection of a leak utilizing systemic analysis. In some embodiments, incentives may be provided to users of the system based on systemic resource usage analysis. Users may earn green energy credits or awards based on their usage compared to others, for example, and/or discounts on an insurance policy covering the structure may be provided.

II. Systemic Resource Utilization Systems

Figure 1:
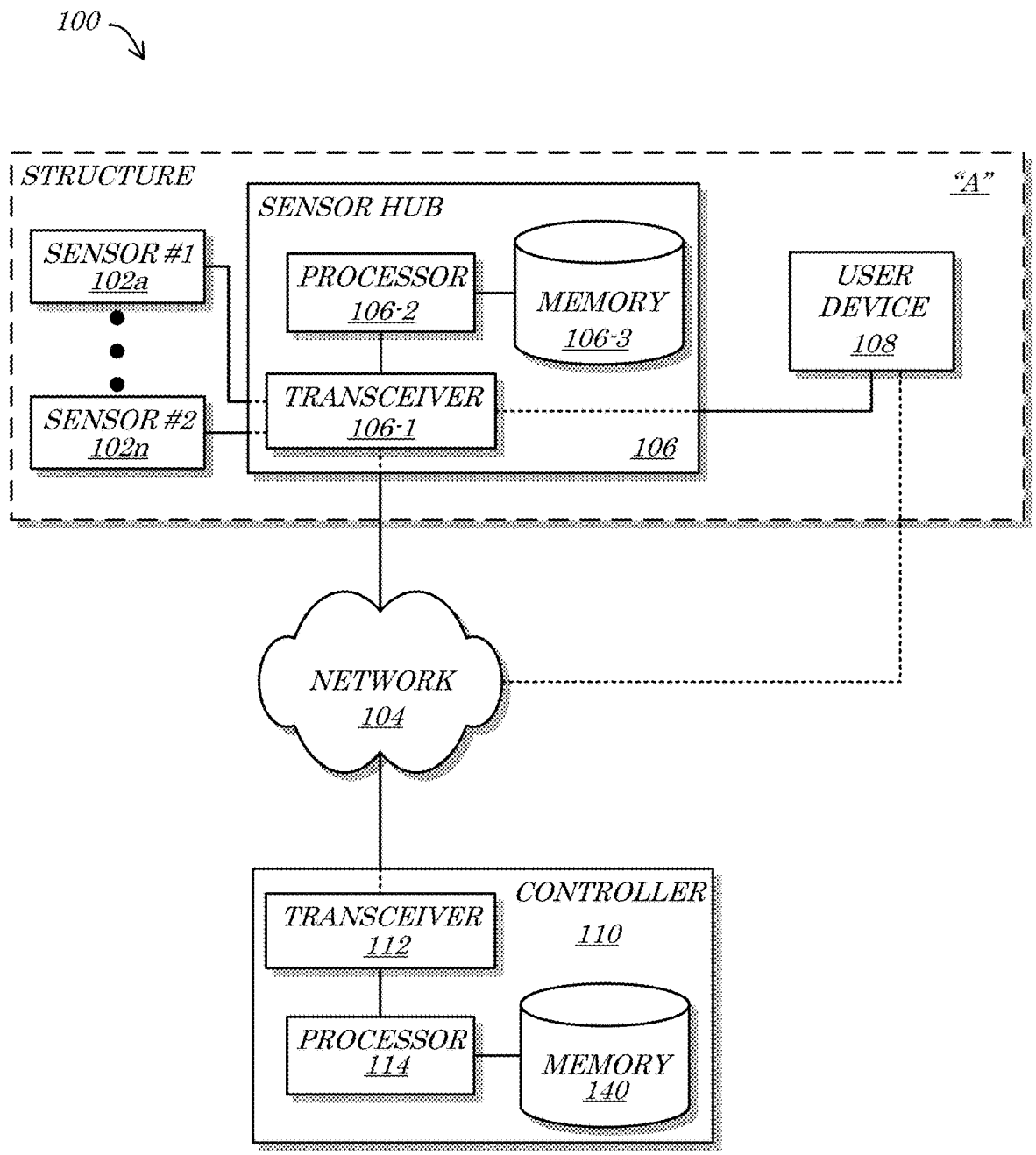
FIG. 1 is a block diagram of a system according to some embodiments.

Referring first to FIG. 1, a block diagram of a system 100 according to some embodiments is shown. In some embodiments, the system 100 may comprise a plurality of sensor devices 102a-n (e.g., coupled to and/or disposed at particular resource entrance or exit points as described herein), a network 104, a sensor hub 106 (e.g., comprising a first or sensor hub transceiver 106-1, a first or sensor hub processor 106-2, and/or a first or sensor hub memory device 106-3), a user device 108, and/or a controller device 110 (e.g., comprising and/or being in communication with a second or controller transceiver 112, a second or controller processor 114, and/or a second or controller memory 140). As depicted in FIG. 1, any or all of the sensors 102a-n, the sensor hub 106, and/or the user device 108 may be disposed in or at a particular structure "A".

In some embodiments, any or all of the devices 102a-n, 106, 108, 110 (or any portions or combinations thereof) may be in communication via the network 104. In some embodiments, the system 100 may be utilized to receive systemic resource usage data, e.g., from the sensors 102a-n. The controller device 110 may, for example, interface with the sensor hub 106, the user device 108, and/or one or more of the sensors 102a-n to receive systemic resource usage data and process such data in accordance with one or more data processing algorithms or models, such as a systemic analysis classification algorithm as described herein. In a non-limiting exemplary case where a first one of the sensors 102a is coupled to a water main inlet of an office building, for example, water usage data (e.g., the speed, pressure, and/or volume of water that passes through, to, and/or out of the single point at which the first sensor 102a is installed) may be analyzed in accordance with a data processing model that (i) compares current water usage to historic water usage data (e.g., stored in the memory 106-3 and/or the memory 140), (ii) compares current water usage to water usage data (e.g., stored in the memory 140) from other structures (not shown), (iii) classifies the current usage, (iv) computes a likelihood of the current usage being indicative of a leak, (v) triggers an alert in the case that the likelihood of the current usage being indicative of a leak is greater than a predetermined threshold, and/or (vi) triggers a closing of a valve at the single point at which the first sensor 102a is installed.

Fewer or more components 102a-n, 104, 106, 108, 110, 112, 114, 140 and/or various configurations of the depicted components 102a-n, 104, 106, 108, 110, 112, 114, 140 may be included in the system 100 without deviating from the scope of embodiments described herein. In some embodiments, the components 102a-n, 104, 106, 108, 110, 112, 114, 140 may be similar in configuration and/or functionality to similarly named and/or numbered components as described herein. In some embodiments, the system 100 (and/or portion thereof) may comprise a systemic resource utilization analysis and/or management program, system, and/or platform programmed and/or otherwise configured to execute, conduct, and/or facilitate the method 300 of FIG. 3 herein, and/or portions thereof.

In some embodiments, the sensor devices 102a-n may comprise one or more sensors configured, disposed, and/or coupled to sense, measure, calculate, and/or otherwise process or determine resource utilization data such as, water readings (flow and/or pressure), air system readings (flow and/or pressure), gas readings (flow and/or pressure), electrical readings ("flow", e.g., amperage and/or resistance, and/or "pressure", e.g., voltage), fluid outflow readings (e.g., air vent readings, drain pipe readings, sanitary sewer readings), location readings, weather readings, time readings, and/or occupancy readings. In some embodiments, such sensor data may be provided to the controller device 110 (e.g., via the sensor hub 106 and/or the network 104) in order to analyze resource utilization for patterns and/or to classify the usage in one or more categories, groups, and/or ranges. The sensor devices 102a-n may comprise, but are not limited to, for example, any number, type, and/or configuration of pressure sensors, flow meters, strain sensors, humidity sensors, temperature sensors, mass sensors, volumetric sensors, and/or voltage, amperage, and/or resistance sensors that are or become known or practicable. As described herein, each sensor 102a-n may be disposed to detect a particular resource utilization by being coupled to a specific inflow or outflow point for the resource in the structure "A". The first sensor 102a may, for example, comprise a potable water supply sensor coupled to a water main inlet (not shown) for the structure "A" and/or the n$^{th}$ sensor 102n may comprise a sanitary sewage sensor coupled to a main sewer outlet (also not shown) for the structure "A".

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the sensor devices 102a-n, the sensor hub 106, and/or the user device 108. In some embodiments, the network 104 may comprise direct communications links between any or all of the components 102a-n, 106, 108, 110, 112, 114, 140 of the system 100. The sensor devices 102a-n may, for example, be directly interfaced or connected to one or more of the controller device 110, the sensor hub 106, and/or the user device 108 via one or more wires, cables, wireless links, and/or other network components, such network components (e.g., communication links) comprising portions of the network 104. In some embodiments, the network 104 may comprise one or many other links or network components other than those depicted in FIG. 1. The user device 108 may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 108, 110, 112, 114, 140 of the system 100. The network 104 may comprise one or more Bluetooth®, NFC, and/or other short-range networks with communication links between the sensor devices 102a-n and the sensor hub 106 (and/or the user device 108), for example, and/or may comprise the Internet, with communication links between the controller device 110 and the sensor hub 106, for example.

The sensor hub 106, in some embodiments, may comprise any type or configuration of gateway, router, and/or other network component that is capable of communicating with the sensor device 102a-n and/or relaying or providing data from the sensors 102a-n to the controller 110. The sensor hub 106 may comprise, for example, the sensor hub transceiver device 106-1 that is communicatively coupled (e.g., via short-range wireless communications protocols such as Bluetooth®) to the sensor devices 102a-n. In some embodiments, the sensor hub transceiver device 106-1 may also be communicatively and/or physically coupled to the sensor hub processor 106-2 that may, for example, comprise an electronic processing device such as a Central Processing Unit (CPU). According to some embodiments, the sensor hub transceiver device 106-1 may receive data from the sensors 102a-n and provide the data to the sensor hub processor 106-2. The sensor hub processor 106-2 may then, for example, store the data in the sensor hub memory 106-3 and/or may process the data in accordance with stored instructions and/or protocols (e.g., to define one or more data certificates as described herein). According to some embodiments, the stored and/or processed data (e.g., one or more data certificates) may be transmitted and/or forwarded or routed (e.g., via the sensor hub transceiver device 106-1) to the controller 110 (and/or the controller transceiver device 112 thereof). In some embodiments, the sensor hub 106 may be paired with and/or to the sensor device 102a-n and/or may automatically (e.g., at predetermined time intervals) forward data to the controller 110 (and/or to the user device 108).

The user device 108, in some embodiments, may comprise any type or configuration of computing, mobile electronic, network, user, and/or communication device that is or becomes known or practicable. The user device 108 may, for example, comprise one or more Personal Computer (PC)

devices, computer workstations (e.g., an underwriter workstation), tablet computers such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user device 108 may comprise a device owned and/or operated by one or more users such as an owner, resident, tenant, and/or building manager of the structure "A". According to some embodiments, the user device 108 may communicate with the controller device 110 via the network 104, such as to receive alerts in the case that resource usage is classified as abnormal (e.g., out of an acceptable range) and/or to participate in an incentive program, such as an insurance credit/discount program and/or a user-based competition, each based on systemic resource utilization readings for one or more structures, such as the structure "A" in FIG. 1.

In some embodiments, the controller device 110 may comprise an electronic and/or computerized controller device, such as a computer server communicatively coupled to interface with the sensor hub 106 and/or the sensor devices 102a-n and/or the user device 108 (directly and/or indirectly). The controller device 110 may, for example, comprise one or more PowerEdge™ M910 blade servers manufactured by Dell®, Inc. of Round Rock, Tex., which may include one or more Eight-Core Intel® Xeon® 7500 Series electronic processing devices. In some embodiments, the controller device 110 may comprise a plurality of processing devices specially programmed to execute and/or conduct processes that are not practicable without the aid of the controller device 110. The controller device 110 may, for example, conduct systemic resource utilization classification calculations in real time or near-real time, such calculations not being capable of being timely conducted without the benefit of the specially programmed controller 110 (and/or controller processor 114). According to some embodiments, the controller device 110 may be located remote from one or more of the sensor hub 106 and/or the sensor devices 102a-n and/or the user device 108 (i.e., remote from the structure "A"). The controller device 110 may also or alternatively comprise a plurality of electronic processing devices (such as the controller processor 114) located at one or more various sites and/or locations.

According to some embodiments, the controller device 110 may store (e.g., in the controller memory 140) and/or execute specially programmed instructions to operate in accordance with embodiments described herein. The controller device 110 may, for example, execute one or more programs, such as a systemic analysis classification algorithm, to classify resource usage data (e.g., with respect to historic data), trigger alerts, compute insurance discounts or other incentives, and/or generate, define, and/or manage a competitive leaderboard, all based on data collected by the sensor devices 102a-n. According to some embodiments, the controller device 110 may comprise a computerized processing device such as a PC, laptop computer, computer server, and/or other electronic device to manage and/or facilitate transactions and/or communications regarding the sensor devices 102a-n. An insurance company employee, agent, claim handler, underwriter, and/or other user (e.g., customer, consumer, client, or company) may, for example, utilize the controller device 110 to (i) price and/or underwrite one or more products, such as insurance, indemnity, and/or surety products (e.g., based on systemic resource utilization calculations) and/or (ii) provide an interface via which a data processing and/or competition management entity may conduct and/or facilitate resource utilization competitions, including outputting competition leaderboards, in accordance with embodiments described herein.

In some embodiments, the controller device 110 and/or the user device 108 (and/or the sensor devices 102a-n) may be in communication with the database 140. The database 140 may store, for example, sensor data (e.g., obtained from the sensor devices 102a-n) and/or instructions that cause various devices (e.g., the controller device 110 and/or the sensor hub 106) to operate in accordance with embodiments described herein. In some embodiments, the database 140 may comprise any type, configuration, and/or quantity of data storage devices that are or become known or practicable. The database 140 may, for example, comprise an array of optical and/or solid-state hard drives configured to store resource utilization data provided by (and/or requested by) the sensor devices 102a-n, sensor location data, structure data, user data, alert data, and/or competition data (e.g., leaderboard data). While the database 140 is depicted as a stand-alone component of the controller 110 (and the system 100) in FIG. 1, the database 140 may comprise multiple components. In some embodiments, a multi-component database 140 may be distributed across various devices and/or may comprise remotely dispersed components. Any or all of the sensor devices 102a-n or user device 108 may comprise the database 140 or a portion thereof, for example, and/or the controller device 110 may comprise the database or a portion thereof (as depicted).

Figure 2:
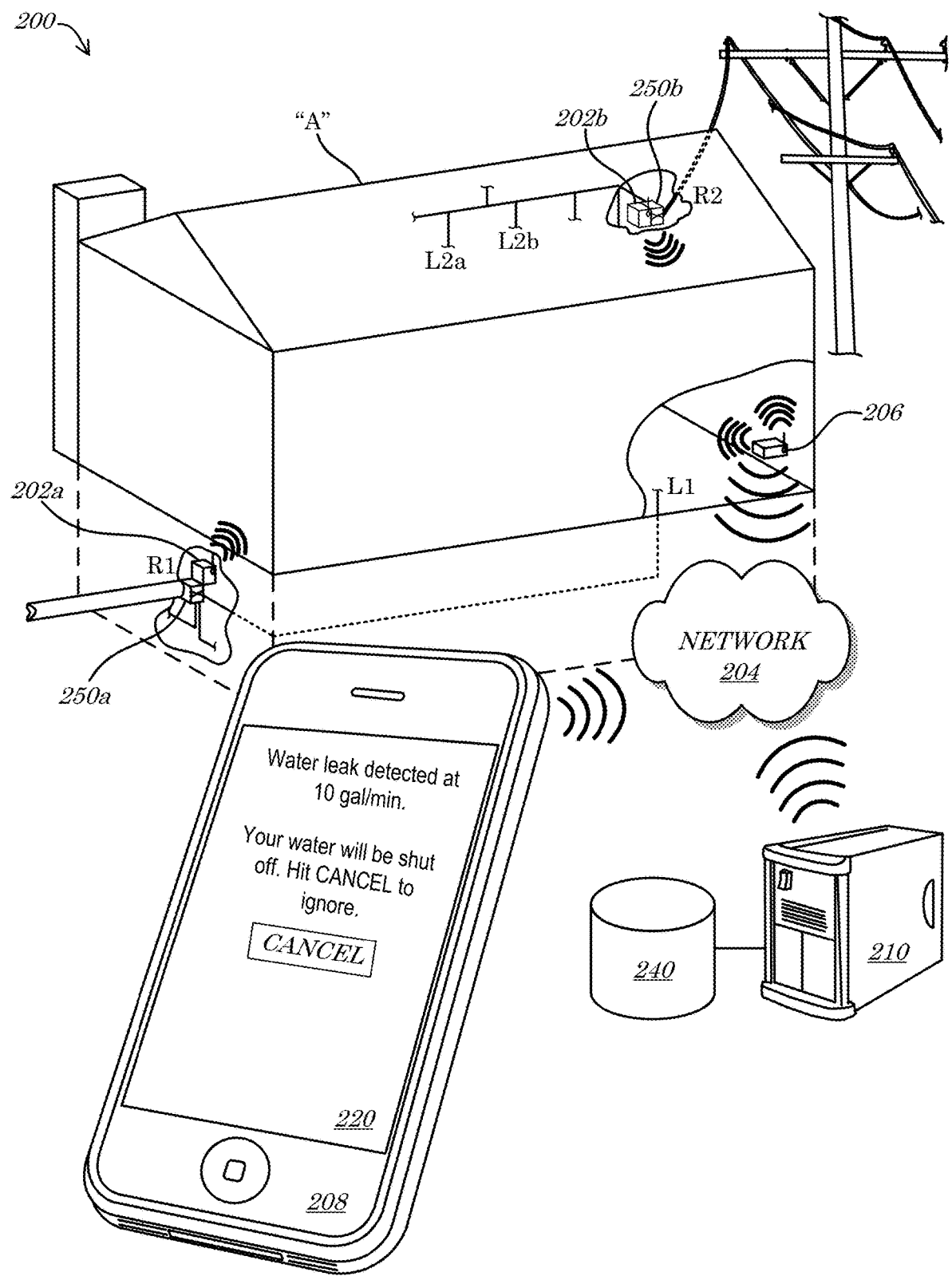
FIG. 2 is a perspective diagram of a system according to some embodiments.

Turning now to FIG. 2, a perspective diagram of a system 200 according to some embodiments is shown. In some embodiments, the system 200 may comprise a systemic resource utilization analysis and management system similar to the system 100 of FIG. 1. The system 200 may comprise, for example, a plurality of sensors 202a-b disposed at, in, or on a particular structure "A". In some embodiments, the sensors 202a-b may sense and/or record data from one or more specific locations in the structure "A". A first one of the sensors 202a may be disposed at a first resource inflow location "R1", for example, and a second one of the sensors 202b may be disposed at a second resource inflow location "R2". As depicted in FIG. 2 for purposes of non-limiting example, the first resource inflow location "R1" may comprise a potable water service primary supply location and/or the second resource inflow location "R2" may comprise an electrical service hookup location (e.g., an electric grid connection).

According to some embodiments, the sensors 202a-b may provide data descriptive of resource usage (e.g., descriptive of resource usage at "R1" and "R2", respectively) via a network 204 and/or via a sensor hub 206. The sensor hub 206 may comprise a router, switch, or gateway device, for example, that utilizes a short-range wireless (e.g., depicted as the smaller, more tightly packed wireless communication symbols in FIG. 2) communication protocol (and appropriate hardware) to communicate with each sensor 202a-b. In some embodiments, the resource usage data may be provided via the network 204 to a mobile electronic device 208, such as a smart phone (as depicted in FIG. 2). The mobile electronic device 208 may, for example, utilize a long-range wireless (e.g., depicted as the larger, less tightly packed wireless communication symbols in FIG. 2) communication protocol to receive the data via the network 204. In some embodiments, the mobile electronic device 208 (and/or the sensor hub 206 and/or the sensors 202a-b) may be in communication, e.g., utilizing a long-range wireless communication protocol and/or via the network 204 with a controller 210. The controller 210 may comprise, for example, a centralized and/or remote server (or server cluster) configured to analyze systemic resource utilization data and/or host or control a mobile application for receiving resource utilization alerts and/or for participating in resource utilization-based incentive and/or competition sessions. According to some embodiments, the mobile electronic device 208 may execute the mobile device application and may generate and/or output an interface 220 (e.g., a Graphical User Interface (GUI)).

In some embodiments, the resource utilization data (e.g., from one or more of the sensors 202a-b) may be output by the mobile electronic device 208 via the interface 220. As depicted in FIG. 2, for example, the interface 220 may present resource utilization data (e.g., "water usage is at 10 gal/min") and/or may prompt a user of the mobile electronic device 208 to indicate (e.g., provide input) whether or not the current (or other time window data output via the interface 220) usage is believed to be "normal" (or not). In such a manner, for example, the system 200 may acquire user feedback and/or input regarding sensor readings to facilitate systemic resource utilization analysis routines. While a particular reading may be computed to be an outlier, out of range, and/or above or below a defined threshold, for example, user input received via the interface 220 may indicate that the usage is acceptable, anticipated, normal, etc. The user may indicate, in some embodiments, a reason for the belief that the usage is "normal", such as an indication that every week at the current time a large amount of water is used to wash a vehicle (or fleet of vehicles).

According to some embodiments, the controller 210 may store such user feedback and/or input in a database 240. The database 240 may also (or alternatively) store readings and/or data from the sensors 202a-b and/or a systemic analysis classification algorithm. In some embodiments, the systemic analysis classification algorithm may be updated or modified based on the user input, such as to allow the systemic analysis classification algorithm to "learn" (e.g., adjust intelligently over time) what usage patterns are expected or likely (e.g., for specific time windows, such as certain days of the week, hours of a given day, times of year, etc.). According to some embodiments, the controller 210 may execute the systemic analysis classification algorithm to analyze resource data to identify (e.g., by utilizing pattern analysis techniques) whether a current (or near-current, such as within the past several minutes) resource reading is indicative of a problem. Problems may, for example, comprise leaks in a resource distribution system (such as plumbing in the structure "A", as depicted by the lines emanating from the first resource inflow location "R1"), failures of connected objects, devices, or machines (e.g., a failing faucet or washing machine), and/or an unintended resource usage (such as unintended or unnecessary electrical loads— e.g., lights being left on when no one is in the structure "A").

In some embodiments, the specific locations of the sensors 202a-b ("R1" and "R2", respectively) may allow the sensors 202a-b to acquire systemic data for the structure "A". The first sensor 202a at the first resource inflow location "R1", for example, may monitor, sense, measure, and/or record overall (or total) water flow into the structure "A". In such a manner, for example, while the first sensor 202a would not be able to identify a leak or failure location within the structure "A", analysis (e.g., by the controller 210) of the systemic data for the first resource (e.g., potable water) may identify a data pattern or trend that indicates that a leak has occurred somewhere in the structure "A"—e.g., without requiring individual additional sensors (not shown) at various locations throughout the structure "A". In other words, the systemic nature of the positioning of the first sensor 202a along with the appropriate data analysis may allow the first sensor 202a to detect a leak (or other failure) at location "L1", without being in proximity to "L1". Similarly, the second sensor 202b may be situated (e.g., electrically coupled) at the second resource inflow location "R2" to measure total flow (or usage) of a second resource (e.g., electricity) into the structure "A". Multiple "phantom loads" at "L2a" and "L2b" (neither being proximate—e.g., in the same room, within standard sensor operational range—to the second resource inflow location "R2" at which the second sensor 202b is situated) may, in some embodiments, be identified or detected by the second sensor 202b by measurement and analysis of the second resource utilization readings over time. In such a manner, for example, total electrical "leakage" for the entire structure "A" may be calculated (e.g., the sum of values for the unnecessary loads at "L2a" and "L2b").

According to some embodiments, the resource inflow locations "R1", "R2" may comprise and/or be outfitted with automatic (e.g., electrically and/or selectively operable to open and/or close) valves or switches 250a-b. The first resource inflow location "R1" may comprise a mechanical or hydraulic valve 250a, for example, which is coupled to govern flow of the first resource (e.g., water) into the structure "A". In some embodiments, the first valve 250a may comprise a solenoid valve such as a Z2ZN0000+ ZONE120NC half inch (0.5"), 2-way, 120V Zone Valve available from Belimo® Aircontrols (USA), Inc. of Danbury, Conn., that is operable to receive signals and respond to the signals by altering the flow and/or usage of the first resource (e.g., by opening, closing, or adjusting to allow for a certain level of resource flow or utilization). According to some embodiments, the second resource inflow location "R2" may comprise a switch or relay 250b which is coupled to govern flow of the second resource (e.g., electricity) into the structure "A". In some embodiments, the switch 250b may comprise a cutoff switch such as an RTSW100A3-SD 100-Amp Automatic Smart Transfer Switch w/ Power Management (Service Disconnect) available from Generac® Power Systems, Inc. of Waukesha, Wis. that is operable to receive signals and respond to the signals by altering the flow and/or usage of the second resource (e.g., by opening, closing, or adjusting to allow for a certain level of resource flow or utilization).

In some embodiments, the controller 210 may identify (and/or compute) a leak or failure situation for a particular resource and may transmit a signal (e.g., via the network 204) to an appropriately coupled automatic valve or switch 250a-b (and/or to the sensor hub 206, which may relay or forward the command signal to the appropriately coupled automatic valve or switch 250a-b). In such a manner, for example, a leak at "L1" may be stopped by remote actuation of the valve 250a and/or the unintended electrical loads at "L2a" and "L2b" may be stopped by remote actuation of the switch 250b. According to some embodiments, actuation commands may be provided by the mobile electronic device 208. User input received via the interface 220 may, for example, comprise a request for actuation of one or more valves or switches 250a-b, e.g., in response to an alarm or alert condition based on systemic resource utilization analysis.

Fewer or more components 202a-b, 204, 206, 208, 210, 220, 240, 250a-b and/or various configurations of the depicted components 202a-b, 204, 206, 208, 210, 220, 240, 250a-b may be included in the system 200 without deviating from the scope of embodiments described herein. In some embodiments, the components 202*a-b,* 204, 206, 208, 210, 220, 240, 250*a-b* may be similar in configuration and/or functionality to similarly named and/or numbered components as described herein. In some embodiments, the system 200 (and/or portion thereof) may comprise a systemic resource utilization analysis and/or management program, system, and/or platform programmed and/or otherwise configured to execute, conduct, and/or facilitate the method 300 of FIG. 3 herein, and/or portions thereof. While the resource inflow locations "R1" and "R2" are presented, for illustrative purposes, as locations where a resource inflows and/or passes into the structure "A", in some embodiments one or more of the locations "R1", "R2" may comprise an outflow location such as a drain, sewer pipe, vent, garbage chute, etc.

III. Systemic Resource Utilization Processes

Figure 3:
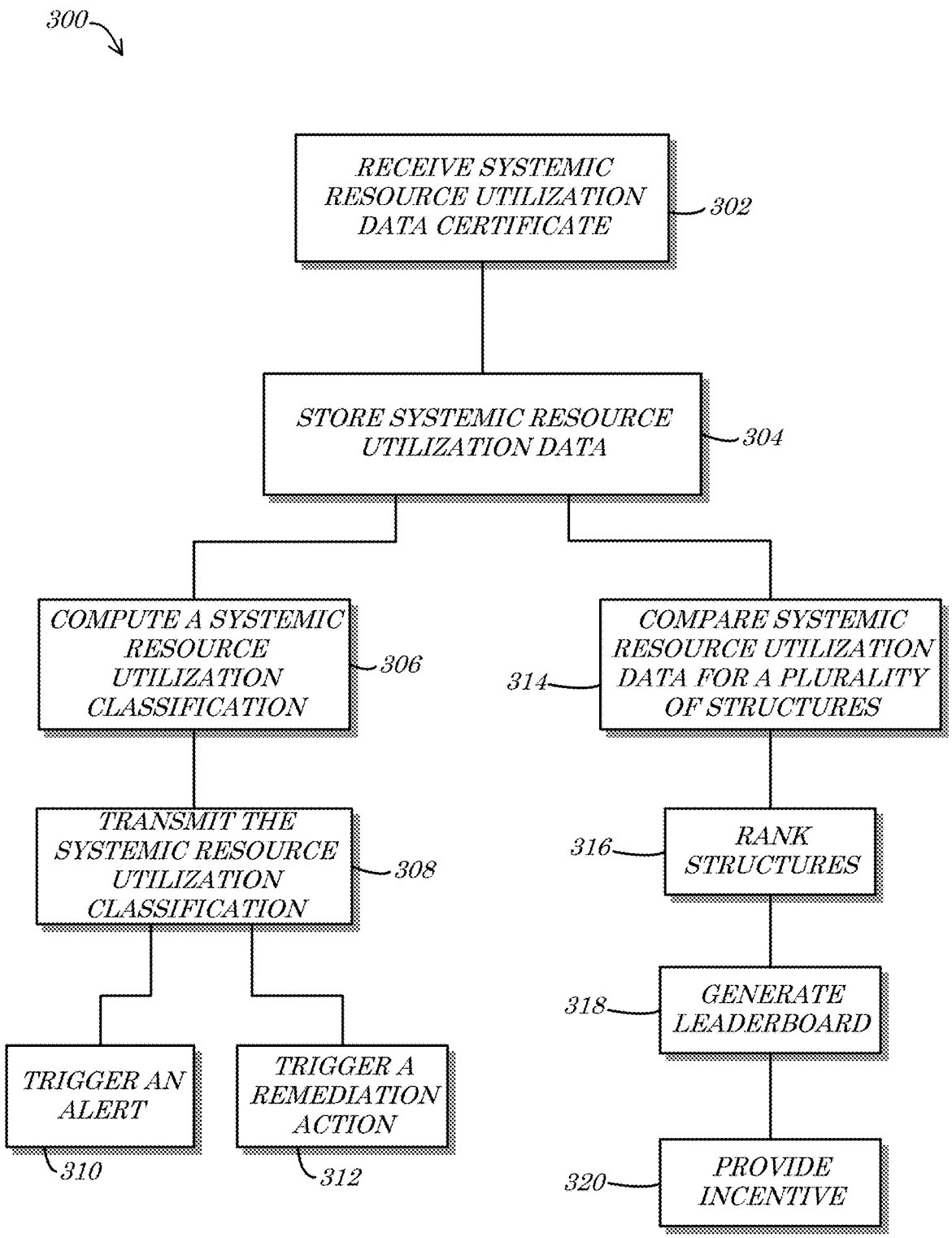
FIG. 3 is a flow diagram of a method according to some embodiments.

Turning now to FIG. 3, a flow diagram of a method 300 according to some embodiments is shown. In some embodiments, the method 300 may be performed and/or implemented by and/or otherwise associated with one or more specially programmed computers (e.g., the sensor hub device 106, 206, the user/mobile device 108, 208, and/or the controller device 110, 210 of FIG. 1 and/or FIG. 2 herein), specialized computers, computer terminals, computer servers, computer systems and/or networks, and/or any combinations thereof (e.g., by one or more multi-threaded and/or multi-core processing units of an insurance company data processing system). In some embodiments, the method 300 may be embodied in, facilitated by, and/or otherwise associated with various input mechanisms and/or interfaces (e.g., the interface 220, 620 of FIG. 2 and/or FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 106-3, 140, 240, 740, 840*a-e* of FIG. 1, FIG. 2, FIG. 7, FIG. 8A, FIG. 8B, FIG. 8C, FIG. 8D, and/or FIG. 8E herein) may store thereon instructions that when executed by a machine (such as a computerized processor) result in performance according to any one or more of the embodiments described herein.

According to some embodiments, the method 300 may comprise receiving (e.g., at each of multiple points in time during a period of time, from a resource sensor hub located in or at a structure, by an electronic communications device, and/or via an electronic network) a token or data certificate, at 302. In some embodiments, the data certificate may be transmitted from a sensor hub and/or sensor to a central server. According to some embodiments, the data certificate may define and/or comprise data descriptive of (i) an identifier of a sensor and/or (ii) a reading from the sensor. In accordance with embodiments described herein, the sensor identified by the data certificate may comprise a sensor device installed (e.g., coupled and/or disposed) at a single point in a building and/or the reading may be descriptive of an amount of a resource that has passed through the single point in the building. The sensor may, for example, be coupled to a primary (or only) inlet, inflow, outlet, or outflow, such that a systemic reading for a particular resource with respect to the structure/building may be acquired. In some embodiments, the data certificate may comprise a unique identifier for the sensor, the structure, a user associated with the structure or sensor, and/or may be encoded and/or encrypted. According to some embodiments, the data certificate may be received at intervals and/or may be descriptive of current readings and/or readings recorded during a previous time period (e.g., yesterday, last week, last month, etc.). In the case that the data certificate is descriptive of resource utilization readings over a period of time, such as a week or month, the sensor hub and/or the sensor may store daily, hourly, and/or other time frequency readings, aggregate and/or process the stored readings (e.g., calculate a total, average, high, low, standard deviation, etc.), and provide the aggregated/processed data to a central server or controller within the data certificate. According to some embodiments, an identifier or code descriptive of the type of data may be provided (e.g., either inherently, such as the data being stored in a particular column, row, and/or position in a data file or stream, or explicitly, such as by being preceded or otherwise related to a code such as "AVG" for a statistical average or "TOT" for an aggregated total). According to some embodiments, the sensor readings and/or data comprising the certificate may include various classification algorithm inputs and/or attributes, such as may be indicative of a location (e.g., address, coordinates, and/or ZIP Code or other regional identifier or grouping), weather conditions, time of day (and/or time period data, such as previous five (5) minutes, previous half hour, previous day, day of week, month year, etc.), occupancy data (e.g., number of people in a structure), mode or setting (e.g., "party mode", "regular" or "standard mode", "vacation" or "away mode", etc.), and/or data descriptive of related (e.g., based on time and/or location) structures.

In some embodiments, the method 300 may comprise storing (e.g., by a non-transitory memory device, for each of the multiple points in time during the period of time, and/or in relation to the identifier of the sensor) the data descriptive of the reading from the sensor, at 304. Upon receiving the data (e.g., from the sensor hub and/or sensor), for example, a processing device may store the data in a database, in relation to the structure, the sensor, the time window/period, etc. In some embodiments, the data (either before or after storing) may be processed, such as by decoding, decryption, extracting, decompressing, ranking, sorting, filtering, de-duping, indexing, etc.

According to some embodiments, the method 300 may comprise computing (e.g., by the central processing device and/or by executing a systemic analysis classification algorithm) a classification of an amount of the resource that has passed through the single point of the structure during the period of time, at 306. Utilizing as inputs to a systemic analysis classification algorithm the stored data descriptive of the readings from the sensor during the period of time, for example, a classification of the amount of the resource that has passed through the single point in the building during the period of time may be derived. According to some embodiments, the classification algorithm may comprise a pattern analysis algorithm that mathematically models resource usage for various time periods. In some embodiments, specific readings or data, such as a current resource utilization rate, may be analyzed with respect to one or more derived patterns and/or mathematical models to determine that an alert condition exists. Thresholds may be established with respect to previous patterns and/or model parameters, for example, to identify data points that do not mathematically fit within the pattern/model. In some embodiments, data may be captured and/or analyzed over an initial data acquisition or "learning" time period to build or derive the pattern and/or model to which later resource utilization values may be compared. According to some embodiments, the algorithm and/or thresholds may be adjusted or set based at least in part on input received from a user. Readings that are preliminarily identified as being abnormal (e.g., lack of mathematical and/or pattern-based fit) may be forwarded to a user (e.g., via an interface provided on a mobile electronics device), for example, and the user may indicate whether the abnormal reading is truly believed to be abnormal (e.g., in which case the threshold may be maintained or confirmed) or whether the reading is believed to be acceptable (e.g., due to special circumstances; e.g., in which case the threshold may be adjusted and/or the particular reading may be ignored or discarded). According to some embodiments, such feedback from the user may be provided in the form of a triggering or setting of a particular "mode". While in a standard mode, for example, the classification of the resource usage may be conducted in accordance with a first algorithm and/or first threshold (or set of thresholds), while when in a "party mode" (e.g., an indication that above-average resource utilization may occur, e.g., for a particular time period and/or while the "party mode" remains engaged or activated), the classification of the resource usage may be conducted in accordance with a second (e.g., different) algorithm and/or second (e.g., different) threshold (or set of thresholds). In such a manner, for example, a user may inform the processing device (and/or systemic resource utilization analysis system) that differing thresholds and/or analysis parameters should be utilized, e.g., to account for expected periods of higher (e.g., "party mode") or lower (e.g., "vacation mode) expected resource utilization.

In some embodiments, the method 300 may comprise transmitting (e.g., by the electronic communications device and to a remote receiver device, and/or in response to the classification of the amount of the resource that has passed through the single point in the building during the period of time) an indication of the classification of the amount of the resource that has passed through the single point in the building during the period of time, at 308. The central controller or server may, for example, transmit an indication of the classification to a user (e.g., via a mobile electronic device utilized by the user) and/or to the sensor hub and/or sensor itself. In the case that the classification is indicative of a leak, failure, potential loss, and/or other non-standard (e.g., outside the pattern or model) reading, for example, the sensor may be interrogated to verify the value for the reading, the sensor may be reset, calibrated, and/or triggered to perform or allow diagnostic analysis, the sensor hub may be notified (e.g., causing the sensor hub to undertake an action), and/or a user's mobile electronic device (and accordingly, the user) may be notified and/or prompted.

According to some embodiments, the method 300 may comprise triggering an alert, at 310. In the case that the indication of the classification of the amount of the resource that has passed through the single point in the building during the period of time (e.g., transmitted to the remote receiver device) comprises and/or identifies an error condition (such as a leak or failure), for example, an alert may be transmitted, pushed, and/or broadcast. The controller device may transmit a signal to the sensor hub, in some embodiments, that causes the sensor hub to output a visual and/or audible alert (e.g., to alert a user in or at the structure to the condition). According to some embodiments, the controller may push a notification to a user's mobile electronic device, such as via proprietary messaging services (e.g., iMessge® or Microsft® Message Services) or via text message (e.g., utilizing Short Message Service (SMS) protocols). An application executed by the mobile electronic device may, for example, be responsive to the indication of the classification of the amount of the resource that has passed through the single point in the building during the period of time by outputting, via an output device of the mobile electronic device, an indication of an alert.

In some embodiments, the method 300 may comprise triggering a remediation action, at 312. The server may transmit, for example, a command to close a valve installed proximate to the single point in the building. In some embodiments, the command signal may be transmitted to the sensor hub that then relays or translates the command and causes the valve, switch, or other device to actuate. According to some embodiments, the command signal may be sent directly to the sensor (e.g., that measured the abnormal reading) and/or an associated and/or connected valve or switch. The sensor and the valve/switch may, for example, comprise a single and/or integrated device that is addressable and operable to be remotely controlled. In some embodiments, such as in the case of an identified leak or equipment failure (e.g., equipment connected to a resource distribution system in the structure), the remedial action command may comprise a trigger to close a valve or switch (e.g., a Normally-Open (NO) circuit may be closed and/or a Normally-Closed (NC) circuit may be opened). In the case of an identified leakage that is not likely to cause damage or merely over-utilization of the resource, such as unintended electrical usage, the remedial action may comprise adjusting the valve/switch to a position in between open and closed (e.g., the switch/valve may be commanded to be set to twenty-five percent (25%) open). According to some embodiments, the remedial action triggering at 312 may comprise computing (e.g., by the central processing device and/or by executing a loss prediction algorithm stored in the non-transitory memory device) a likelihood of damage for the building. The remedial action may only be triggered in some embodiments, for example, in the case that the likelihood of damage exceeds a predetermined threshold. According to some embodiments, the computing of the likelihood of loss may comprise utilizing as inputs to a loss prediction algorithm at least one of (i) the classification of the amount of the resource that has passed through the single point in the building during the period of time and (ii) the stored data descriptive of the readings from the sensor during the period of time. In some embodiments, in the case that the likelihood of damage is computed to exceed the threshold, the triggering of the remedial action at 312 may comprise transmitting (e.g., by the electronic communications device, to a remote receiver device, and/or in response to the computed likelihood of damage for the structure) a command to close a valve coupled to govern flow of the resource through the single point in the building.

In some embodiments, the method 300 may comprise comparing (e.g., by the central processing device) the classification of the amount of the resource that has passed through the single point in the building during the period of time to classifications of resources in other structures/buildings (e.g., for a particular time period), at 314. Systemic resource utilization data and/or classifications for a plurality of structures, buildings, areas, accounts, and/or entities may be tabulated, sorted, and/or scored, for example. In some embodiments, total aggregate, average, maximum (and/or maximum daily), minimum (and/or minimum daily), and/or other data metrics descriptive of systemic resource utilization may be compared and/or contrasted. In some embodiments, the comparison may be utilized to conduct an incentive program and/or competition (e.g., a game).

According to some embodiments, the method 300 may comprise ranking (e.g., by the central processing device and/or based on the comparison) the structures, at 316. Structures, accounts, and/or other categories associated with systemic resource utilization data may, for example, be ranked based on various usage parameters, such as total or average usage for certain time periods and/or the number of times or occurrences of certain systemic resource classification results of particular types (e.g., a number of abnormal readings). In some embodiments, lower data values may be ranked highest, such as in the case that the structures are ranked based on how environmentally friendly or "green" the structures are, based on lower resource usage values and/or classifications. Similarly, fewer numbers of adverse classification events, such as leaks (or "high" usage), may be ranked higher than larger numbers of occurrences of adverse classification events. According to some embodiments, higher values of resource utilization and/or classification may be ranked higher. In the case that the resource is fresh air (e.g., as moved through a fresh air handling and/or ventilation system), for example, it may be deemed more desirable to move higher amounts of fresh air into a building. In some embodiments, structures, buildings, and/or accounts or entities of certain similar types may be grouped and ranked together (and/or other types may be filtered out or separately ranked). All buildings of a certain size, usage category, Leadership in Energy and Environmental Design (LEED) certification rating, or geographic area (e.g., climate and/or hardiness zone) may, for example, be ranked with respect to one another based on systemic resource utilization data and/or classifications thereof.

In some embodiments, the method 300 may comprise generating (e.g., by the central processing device and/or based on the ranking) a leaderboard, at 318. The leaderboard may comprise, for example, a graphical depiction of the ranking from 316. According to some embodiments, the leaderboard may be generated and/or defined as part of an interface, such as a GUI provided to a user by a mobile device application in communication with the central server or controller device. The user's mobile electronic device may execute specially coded application instructions, for example, to generate an interface screen (e.g., the interface 210, 610 of FIG. 2 and/or FIG. 6 herein) via which the rankings of the structures, buildings, and/or accounts may be readily perceived (e.g., visually or otherwise). In some embodiments, such as to preserve privacy, the leaderboard may be structured to display the ranking of the user being provided with the leaderboard, as well as limited information regarding the structures/accounts/users occupying other leaderboard positions. Screen names, handles, nicknames, partial names or addresses, and/or other limited, identity-shielding information may, for example, be provided via the leaderboard. According to some embodiments, a geographical distance may be provided to identify other users on the leaderboard. In such a manner, for example, a user may be shown how far away from the user (and/or the user's associated structure/building/home) the other ranked entities are.

According to some embodiments, the method 300 may comprise providing an incentive, at 320. The providing may comprise, for example, computing (e.g., by the central processing device and/or based at least in part on the classification of the amount of the resource that has passed through the single point in the building during the period of time) an amount of credits earned for the structure, building, and/or account. In some embodiments, the credits may be based on the type of resource monitored, the amount of utilization, and/or the systemic resource classification. In the case that the systemic resource utilization is below a threshold, for example, the usage may be considered "green" and may accordingly earn (or qualify for) a number of green energy credits. In the case that the systemic resource utilization classification results in fewer than a given threshold number of adverse (e.g., potentially loss-inducing) events (e.g., for a certain time period), the usage may be considered "safe" or "low risk" and may accordingly earn (or qualify for) a number of insurance policy credits (e.g., discounts or other benefits). According to some embodiments, various tiers, levels, and/or multiple thresholds may be utilized to award varying amounts of credits (or other incentives) to entities based on the systemic resource utilization rates, amounts, and/or classifications. In some embodiments, the incentive(s) may be provided to only a subset of qualifying entities. Incentives may only be provided, for example, to the entities placing in the first one (1), two (2), or three (3) positions of the leaderboard from 318 (and/or respective or underlying rankings, e.g., from 316). According to some embodiments, the providing may comprise transmitting (e.g., by the electronic communications device and/or to a remote receiver device) an indication of the amount of credits earned. Details regarding the type, quantity, and/or other characteristic of earned or warded incentive may, for example, be transmitted to the sensor hub and/or a user's mobile electronic device, such as via a GUI interface.

IV. Systemic Resource Utilization Example Charts

Figure 4:
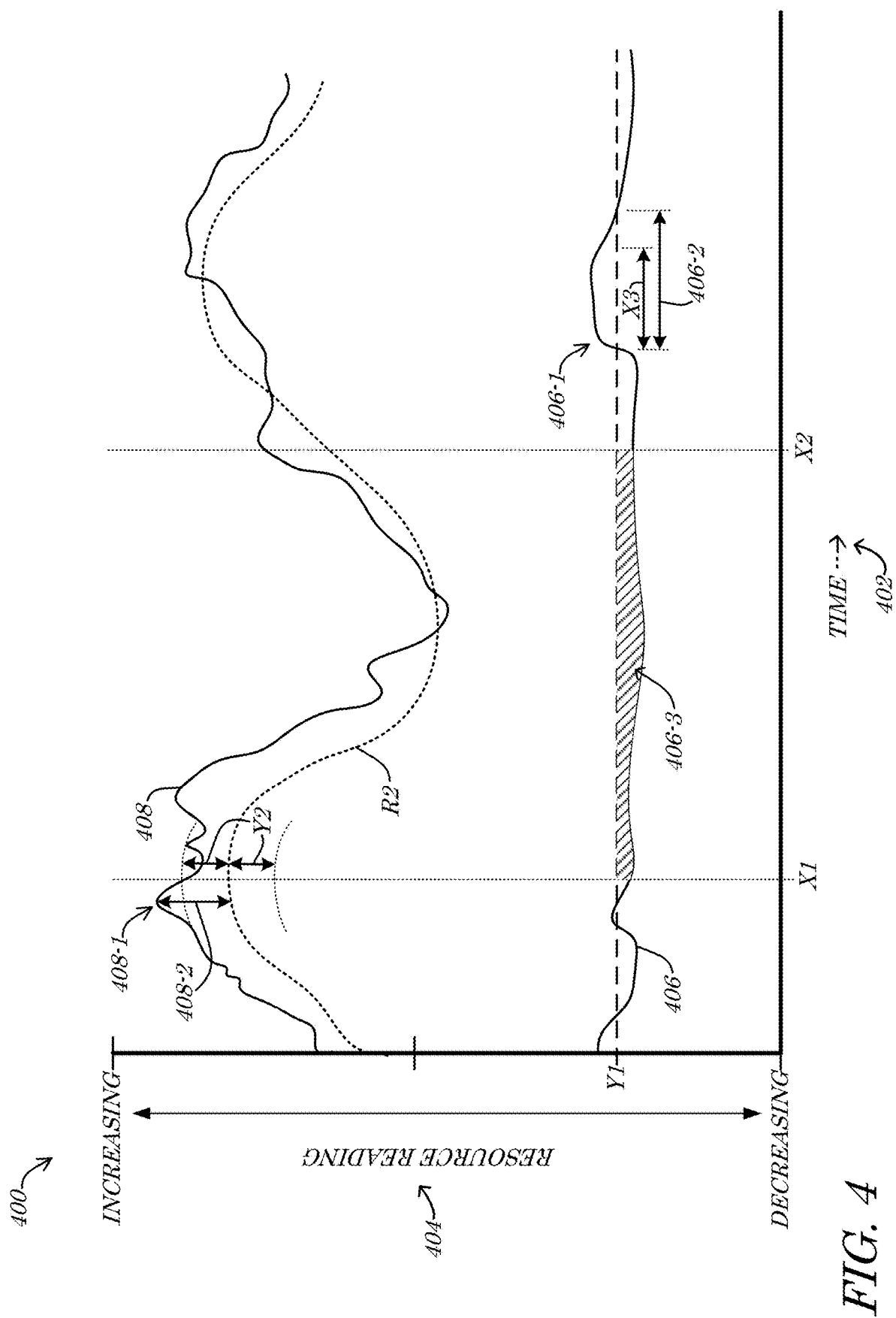
FIG. 4 is diagram of a chart according to some embodiments.

Referring now to FIG. 4, a diagram of a chart 400 according to some embodiments is shown. The chart 400 may, for example, comprise an X-axis 402 descriptive of a progression of time (time progressing from left to right) and/or a Y-axis 404 descriptive of a value for systemic resource readings (increasing in value from bottom to top). As depicted with respect to a particular structure, building, account, entity, etc., values for a first resource reading 406 and/or values for a second resource reading 408, may be plotted.

In some embodiments, such as with respect to the first resource, a threshold "Y1" may be defined. The threshold "Y1" may, for example, represent a systemic resource level that, if exceeded, triggers an alarm condition, an alert, and/or remedial action (e.g., remote activation of a valve/switch). As depicted in FIG. 4, the values for the first resource reading 406 both exceed and fall below the threshold "Y1" (for exemplary purposes only) at various times. In some embodiments, specific timeframes or windows may be analyzed and/or relevant. In FIG. 4, and with respect to the first resource for example, a time window may be defined between a first time "X1" and a second time "X2". According to some embodiments, only readings occurring or falling in the time window (i.e., between "X1" and "X2") may be analyzed. As depicted, the values for the first resource reading 406 do not exceed the threshold "Y1" during the time period and in accordance with some embodiments, would therefore not trigger an alert condition. In some embodiments, one or more readings above the threshold "Y1" may trigger an alert or alarm condition. The values for the first resource reading 406 jump above the threshold "Y1" at 406-1, for example, and may accordingly trigger an indication of an adverse event and/or classification. In some embodiments, the exceeding of the threshold (e.g., at 406-1) may only trigger an alarm condition (e.g., an associated alert notification and/or remedial action trigger) in the case that the values for the first resource reading 406 maintain above the threshold for longer than a certain period of time. In the example depicted in FIG. 4, for example, because the values for the first resource reading 406 maintain above the threshold for a period of time 406-2 (e.g., a period of deviation and/or non-compliance) that is longer than a threshold period of time "X3", the first resource may be deemed indicative of a negative occurrence or incident and may accordingly trigger an alarm condition.

According to some embodiments, the threshold "Y1" may be utilized to determine, compute, and/or calculate an amount of credits, points, and/or incentives based on the values for the first resource reading 406. As depicted in FIG. 4, for example, in the case that the values for the first resource reading 406 are maintained below the threshold "Y1" during the time period defined by "X1" and "X2", an incentive amount 406-3 may be determined. The incentive amount 406-3 may, for example, comprise an amount of resource over time that the values for the first resource reading 406 deviated from the threshold "Y1". In such a manner, such as in the case that the first resource comprises electricity for example, an amount of electrical usage below a time-based usage threshold may be calculated. The incentive amount 406-3 may, in some embodiments, be indicative of an amount, quantity, and/or type of credit, score, and/or incentive. In the example depicted in FIG. 4, for example, the incentive amount 406-3 may equate to a number of "green" energy credits due based on the measured systemic utilization of the first resource.

In some embodiments, the values for the second resource reading 408 may be analyzed to determine a pattern, trend, and/or model. Mathematical modeling and/or pattern analysis may be utilized to classify, model, and/or predict expected behavior of the values for the second resource reading 408, for example, as depicted by the trend, model, or pattern line "R2" in FIG. 4. According to some embodiments, the trend line "R2" may be modelled based on previously measured (e.g., historic) data that is, e.g., different than the values for the second resource reading 408 depicted in FIG. 4. In such a manner, for example, the values for the second resource reading 408 may be compared to the model "R2" to determine, identify, and/or quantify and deviations therefrom. As depicted, the actual values for the second resource reading 408 vary by different amounts, above and below the model "R2" over time. According to some embodiments, a model threshold "Y2" may be established, above and/or below which, values for the second resource reading 408 may be considered a deviation from the model "R2". As depicted in FIG. 4, the second resource reading 408 may deviate from the model "R2" at 408-1 by a deviation amount 408-2 that exceeds the model threshold "Y2". In such a case, it may be determined that the classification of the values for the second resource reading 408 at 408-1 are negative and/or indicative of a negative occurrence (such as a leak or equipment failure) and may accordingly trigger an alarm event (and/or associated alerts and/or remedial actions).

According to some embodiments, any or all of the components 402, 404, 406, 406-1, 406-2, 406-3, 408, 408-1, 408-2 (and/or "X1", "X2", "X3", "Y1", "Y2", and/or "R2") of the chart 400 may be similar in configuration and/or functionality to any similarly named and/or numbered components described herein. Fewer or more components 402, 404, 406, 406-1, 406-2, 406-3, 408, 408-1, 408-2 (and/or "X1", "X2", "X3", "Y1", "Y2", and/or "R2") and/or various configurations of the components 402, 404, 406, 406-1, 406-2, 406-3, 408, 408-1, 408-2 (and/or "X1", "X2", "X3", "Y1", "Y2", and/or "R2") may be included in the chart 400 without deviating from the scope of embodiments described herein. The data, trends, models, patterns, thresholds, axis types, and any values or relational attributes depicted in FIG. 4 are provided for explanatory purposes only and are not intended to be limiting or indicative of all disclosed embodiments.

Figure 5:
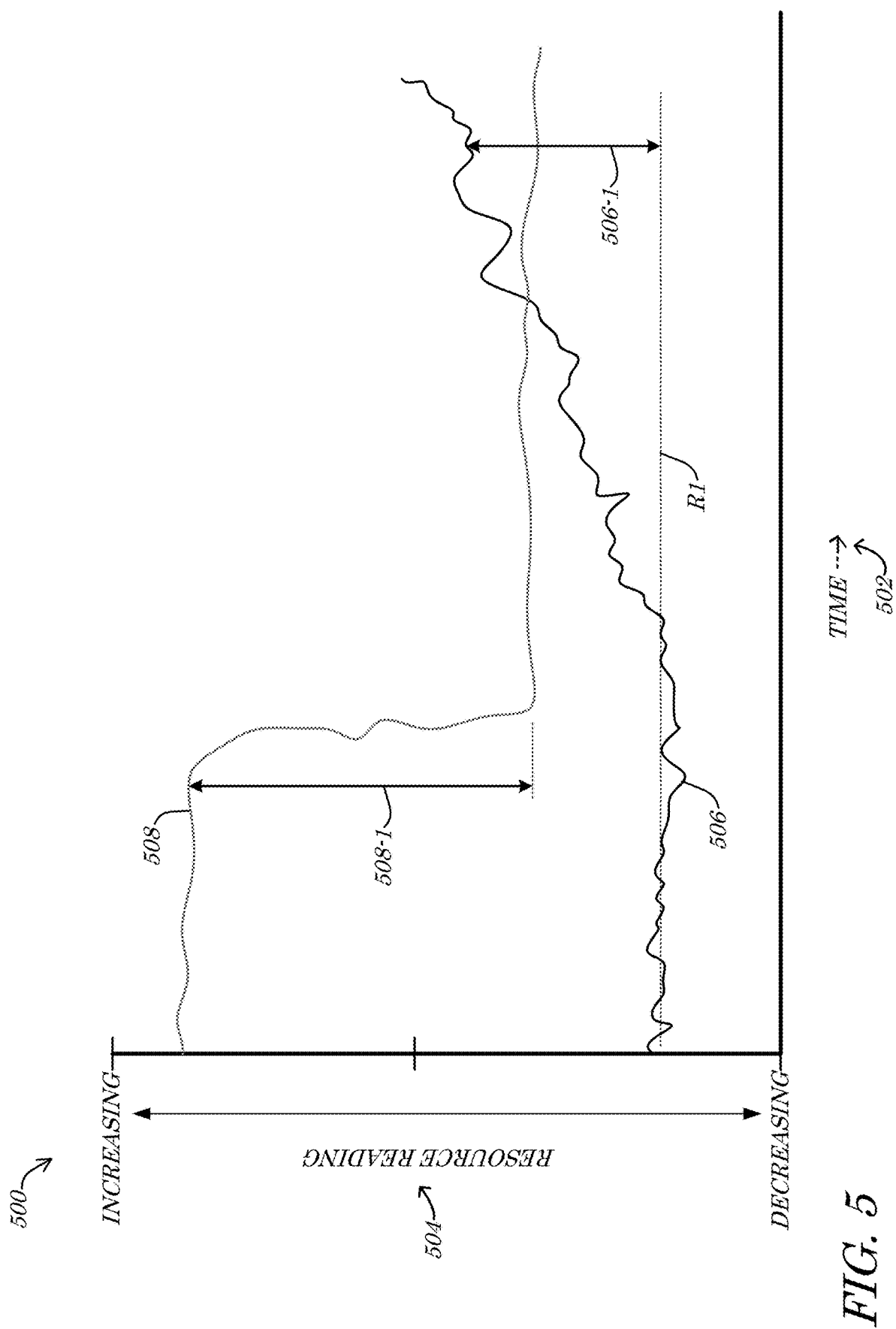
FIG. 5 is diagram of a chart according to some embodiments.

Turning to FIG. 5, a diagram of a chart 500 according to some embodiments is shown. The chart 500 may, for example, comprise an X-axis 502 descriptive of a progression of time (time progressing from left to right) and/or a Y-axis 504 descriptive of a value for systemic resource readings (increasing in value from bottom to top). As depicted with respect to a particular structure, building, account, entity, etc., values for a first resource reading 506 and/or values for a second resource reading 508, may be plotted.

In some embodiments, such as depicted with respect to the values for a first resource reading 506, the systemic resource usage over time may increase. According to some embodiments, a mathematical average, trend, or fit line "R1" may be calculated based on at least a subset of the values for the first resource reading 506. In such a manner, for example, a rate of change of the values for the first resource reading 506 over time may be calculated by identifying a deviation 506-1 from the fit line "R1". In some embodiments, rates of change over a certain threshold may be classified as negative events and/or may otherwise trigger an alarm condition, alters, and/or remedial action.

According to some embodiments, one or more values for the second resource reading 508 may be analyzed with respect to previous values for the same resource. As depicted in FIG. 5, for example, a measurable drop in the values for the second resource reading 508 may be quantified as an absolute deviation 508-1 from a previous reading value, level, state, pattern, etc. In some embodiments, a positive, negative, and/or absolute change in values for the second resource reading 508 that exceed a predetermined threshold may be classified and/or otherwise considered indicative of an alarm condition. As a non-limiting example, in the case that the values for the second resource reading 508 drop by fifty percent (50%) or more (e.g., as depicted in FIG. 5), an alert and/or remedial action may be triggered. Such a drop in values for the second resource reading 508 may, for example, be indicative of a sewer pipe outflow that has become clogged or an air supply (or return) that may indicate a duct breach, clog, and/or fouled filter.

According to some embodiments, any or all of the components 502, 504, 506, 506-1, 508, 508-1 (and/or "R1") of the chart 500 may be similar in configuration and/or functionality to any similarly named and/or numbered components described herein. Fewer or more components 502, 504, 506, 506-1, 508, 508-1 (and/or "R1") and/or various configurations of the components 502, 504, 506, 506-1, 508, 508-1 (and/or "R1") may be included in the chart 500 without deviating from the scope of embodiments described herein. The data, trends, models, patterns, thresholds, axis types, and any values or relational attributes depicted in FIG. 5 are provided for explanatory purposes only and are not intended to be limiting or indicative of all disclosed embodiments.

V. Systemic Resource Utilization Example Interface

Figure 6:
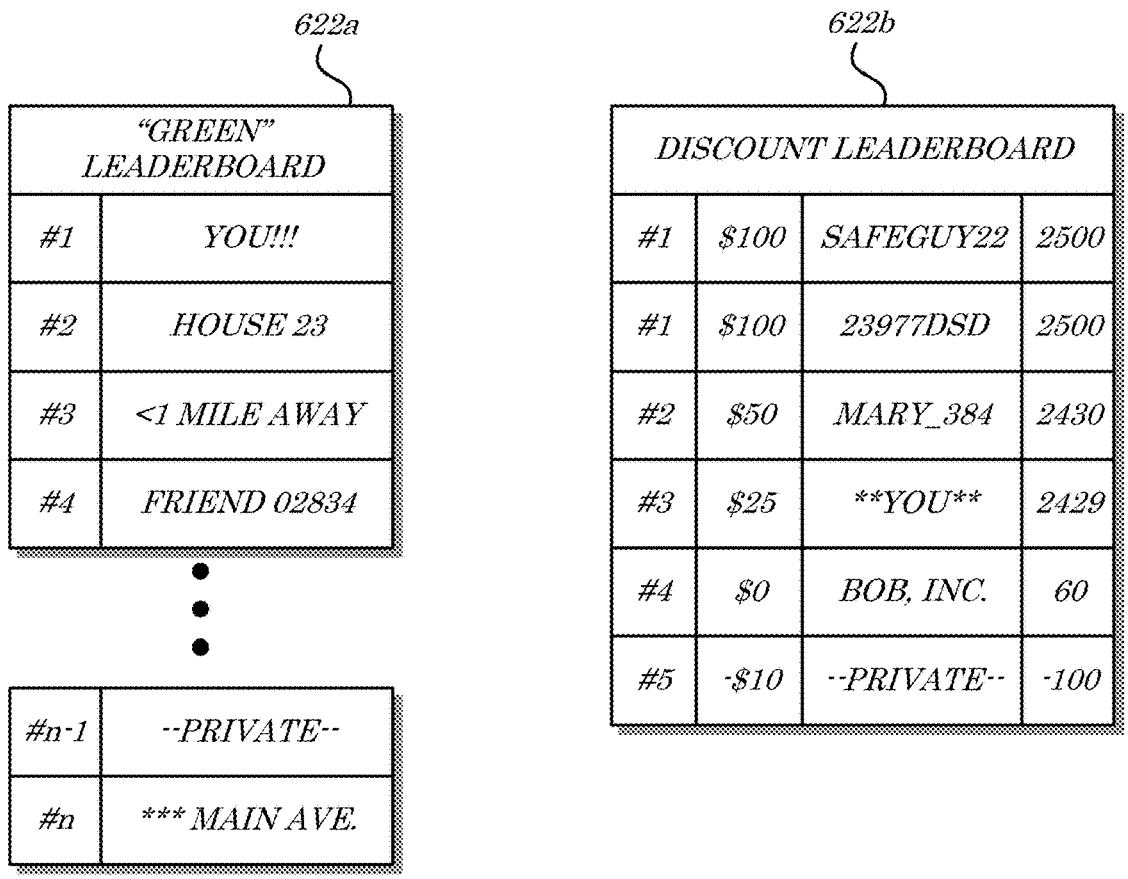
FIG. 6 is diagram of an interface according to some embodiments.
Figure 6:
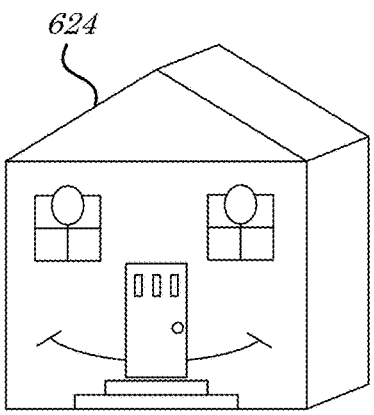
Figure 6:

Referring now to FIG. 6, a diagram of an interface 620 according to some embodiments is shown. The interface 620 may, for example, be generated and/or output by a mobile electronic device in association with a systemic resource utilization analysis of one or more structures. According to some embodiments, one or more leaderboards 622a-b may be graphically depicted by the interface 620. A first leaderboard 622a may comprise a "green" leaderboard that displays a plurality of rows, one for each ranked position of a "green"-themed game or competition. As depicted, the first leaderboard 622a may display a rank or position indicator such as "#1" in a first column and an entity identifier such as "House 23" in a second column. In such a manner, for example, a user (not shown) of the interface 620 may be provided with information that shows that the user (i.e., "YOU!!!") is in first place and that a structure that is less than one mile away (i.e., "<1 MILE AWAY") is in third place. According to some embodiments, the first place entity may be awarded a number of "green" credits as a "green" competition prize, such as for consuming the least amount of a particular resource over a period of time (e.g., a monthly or annual "green" competition). In some embodiments, the first leaderboard 622a may be populated and/or updated based on one or more systemic resource utilization readings and/or classifications as described herein.

According to some embodiments, a second leaderboard 622b may comprise a discount leaderboard that displays a plurality of rows, one for each ranked position of a competition or game where a discount is awarded as a prize. As depicted, the second leaderboard 622b may display a rank or position indicator such as "#1" in a first column, a discount reward level such as "$100" in a second column, an entity identifier such as "SafeGuy22" in a third column, and/or a point total such as "2500" in a fourth column. In such a manner, for example, the user (not shown) of the interface 620 may be provided with information that shows that the user is currently in third place, which qualifies the user for a twenty-five dollar ($25) discount (or other monetary award or incentive). The information may also show, as depicted in FIG. 6, that the user is only two (2) points away from moving into second place. In some embodiments, such as in the case that the prizes and/or incentives are not limited or unique, more than one user/player may earn or qualify for the same prize and/or value of inventive (e.g., the first place tie depicted in FIG. 6). In some embodiments, the discount or incentive may comprise a discount or credit for an insurance policy premium and/or deductible. Each user/player that earns enough points (e.g., two thousand five hundred (2500)) to reach a threshold scoring level, for example, may earn a discount (e.g., one hundred dollars ($100)) applicable to an insurance premium payment. Points may be earned in a variety of ways related to systemic resource utilization as described herein, such as by consuming less of a resource, consuming more of a resource, maintaining resource consumption within a predetermined range, reducing a number and/or frequency of negative events (e.g., alarm conditions), etc.

In some embodiments, the interface 620 may also or alternatively comprise a virtual object 624, such as graphical depiction of a building or home (e.g., as shown), an avatar, an icon, an animation, etc. The virtual object 624 may, in some embodiments, be affected and/or altered based on systemic resource utilization readings and/or classifications. Each time a negative systemic resource event is computed to occur, for example, the virtual object 624 may change in appearance such as by becoming less vibrant, transitioning to a state of lower repair, and/or becoming less "healthy". The virtual object 624 may, in some embodiments, comprise a level of "healthiness," as graphically depicted by a health meter 626 in the interface 620. According to some embodiments, the level of health displayed in the health meter 626 may increase as a systemic resource utilization reading and/or classification decreases. As depicted in FIG. 6, the virtual object 624 may comprise a personified graphical depiction of a structure, such as a house that becomes less "healthy" as systemic resource utilization increases and/or results in more alarm conditions (or more frequent alarm conditions). In such a manner, for example, a user may be compelled to take measures to increase systemic resource utilization compliance to maintain the health of the virtual object 624 (e.g., to prevent their house from becoming "sick", as may be graphically represented via the interface 620).

VI. Systemic Resource Utilization Apparatus and Articles of Manufacture

Figure 7:
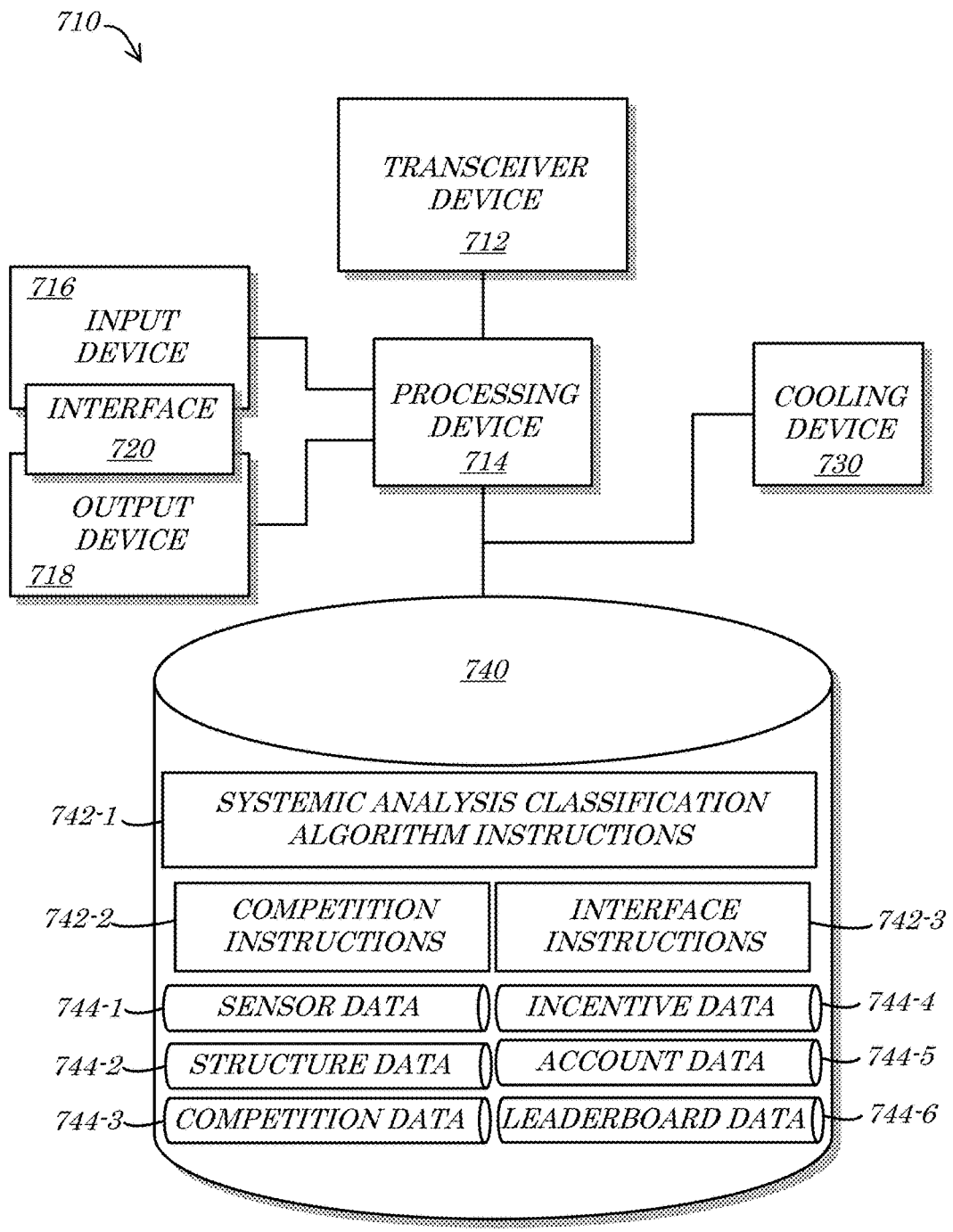
FIG. 7 is a block diagram of an apparatus according to some embodiments.
Figure 8A:
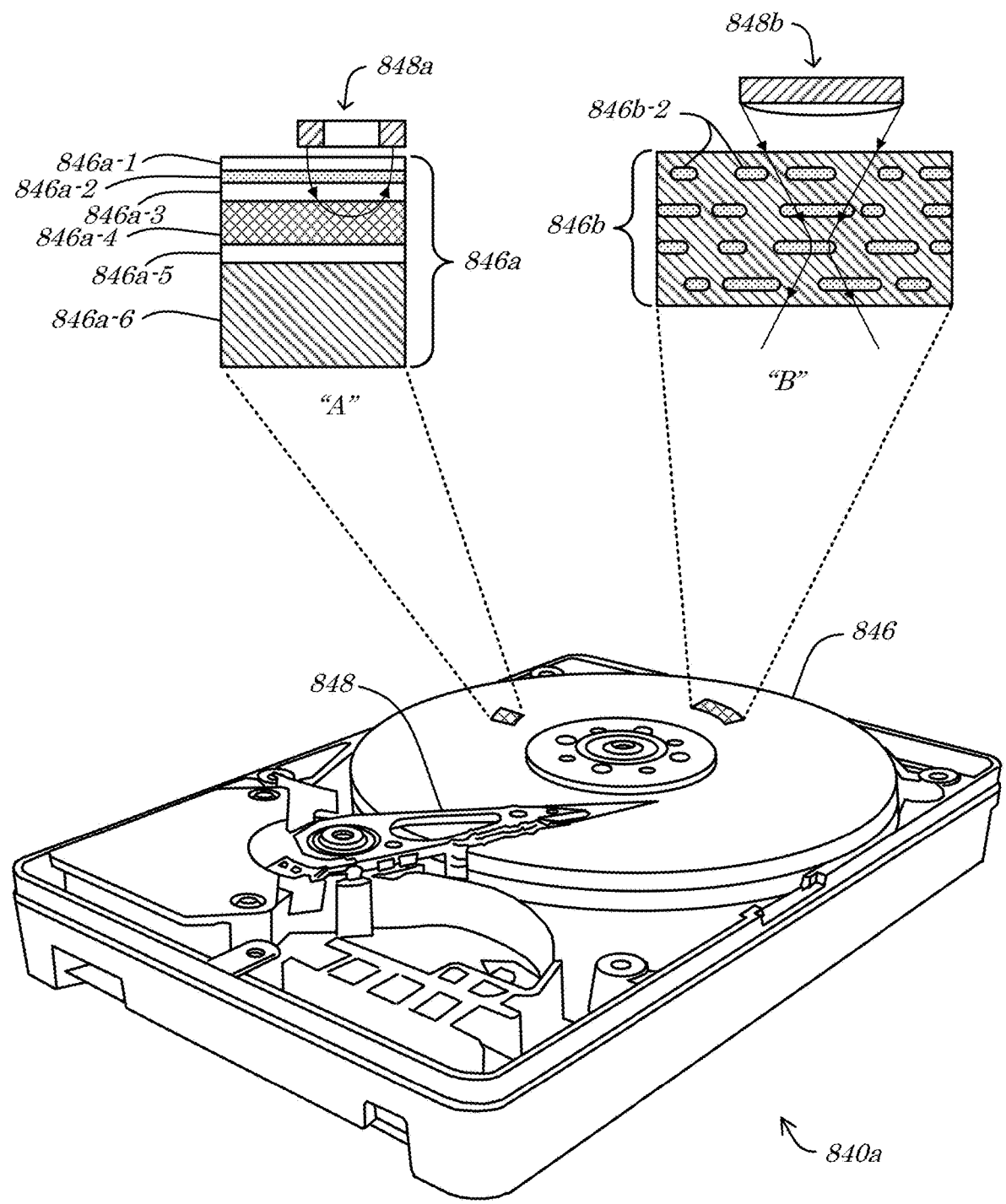
FIG. 8A, FIG. 8B, FIG. 8C, FIG. 8D, and FIG. 8E are perspective diagrams of exemplary data storage devices according to some embodiments.
Figure 8B:
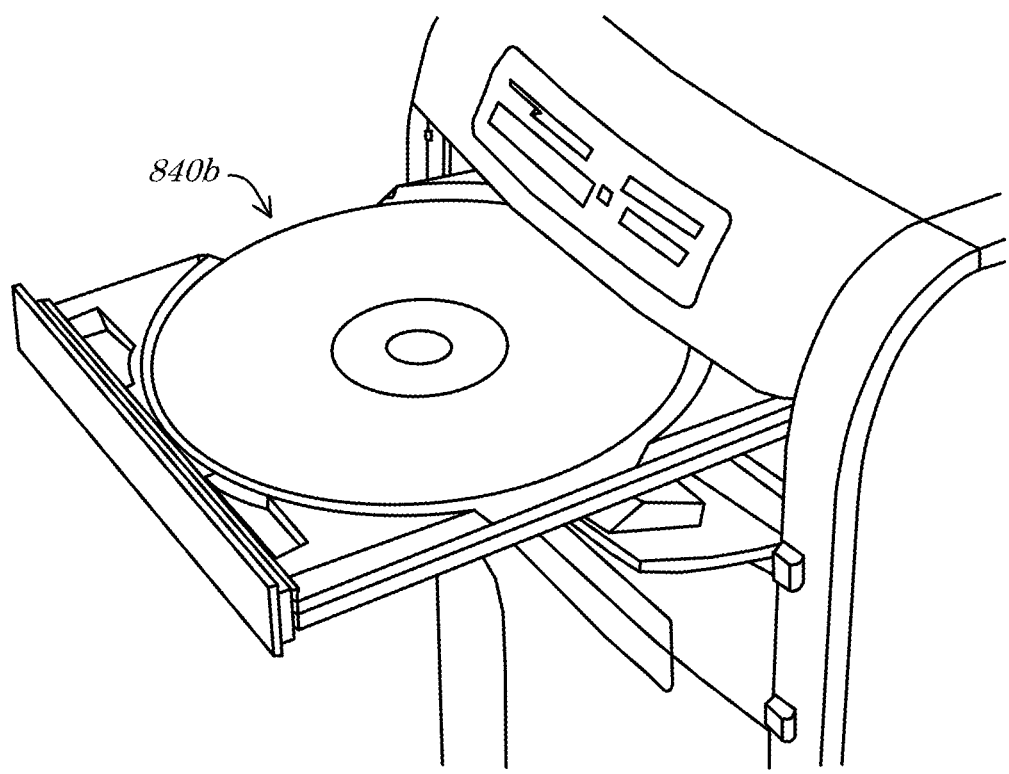
Figure 8C:
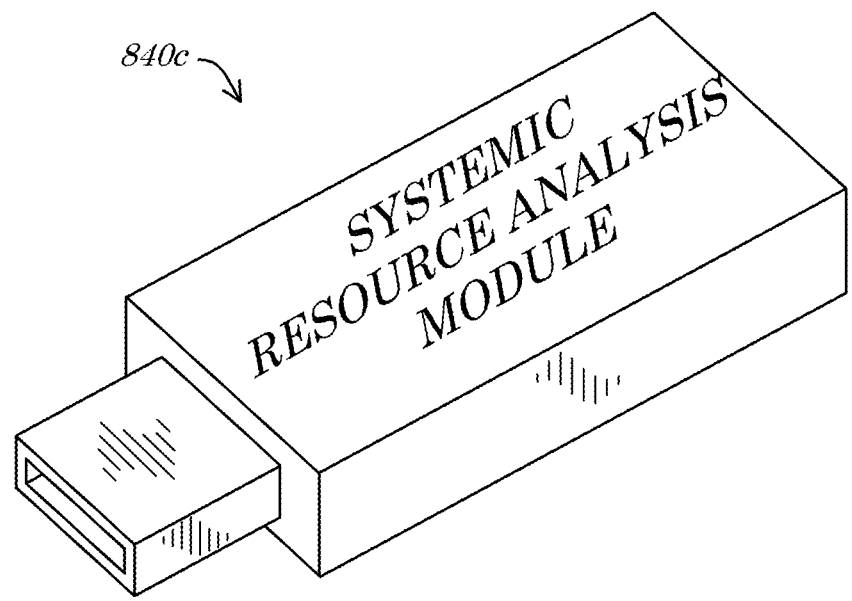
Figure 8D:
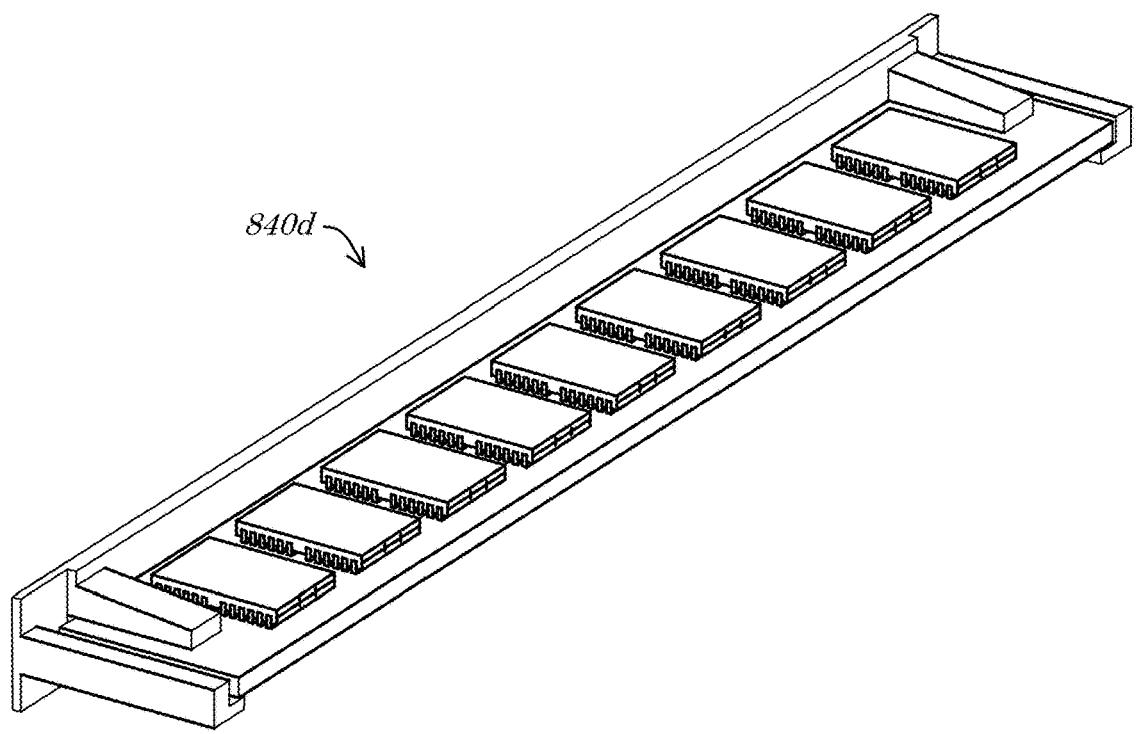
Figure 8E:
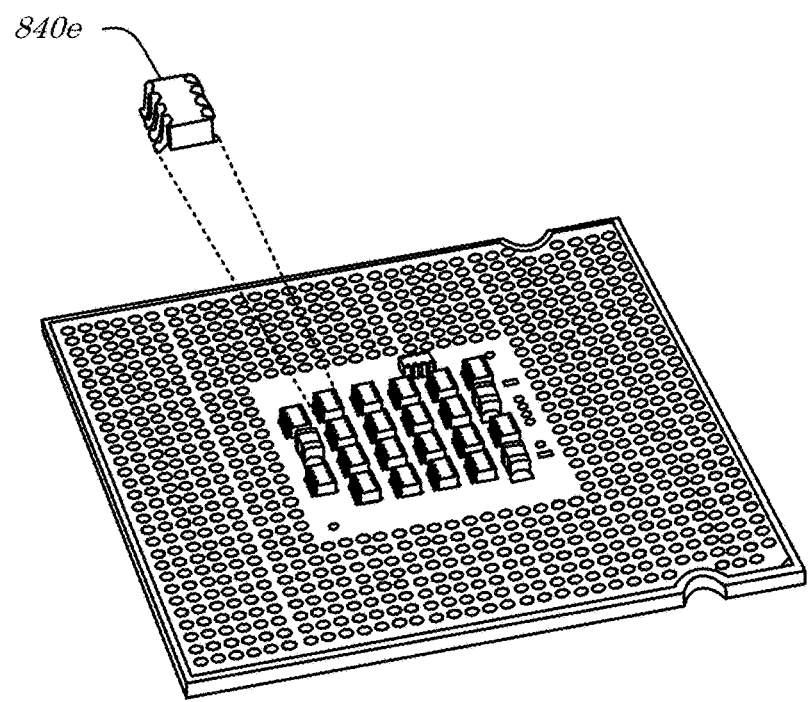

Turning to FIG. 7, a block diagram of an apparatus 710 according to some embodiments is shown. In some embodiments, the apparatus 710 may be similar in configuration and/or functionality to any of the sensor devices 102a-n, 202a-b, the sensor hubs 106, 206, the user devices 108, 208, and/or the controller devices/servers 110, 210 of FIG. 1 and/or FIG. 2 herein, and/or may otherwise comprise a portion of the systems 100, 200 of FIG. 1 and/or FIG. 2 herein. The apparatus 710 may, for example, execute, process, facilitate, and/or otherwise be associated with the method 300 described in conjunction with FIG. 3 herein, and/or one or more portions thereof. In some embodiments, the apparatus 710 may comprise a transceiver device 712, one or more processing devices 714, an input device 716, an output device 718, an interface 720, a cooling device 730, and/or a memory device 740 (storing various programs and/or instructions 742 and data 744). According to some embodiments, any or all of the components 712, 714, 716, 718, 720, 730, 740, 742, 744 of the apparatus 710 may be similar in configuration and/or functionality to any similarly named and/or numbered components described herein. Fewer or more components 712, 714, 716, 718, 720, 730, 740, 742, 744 and/or various configurations of the components 712, 714, 716, 718, 720, 730, 740, 742, 744 may be included in the apparatus 710 without deviating from the scope of embodiments described herein.

In some embodiments, the transceiver device 712 may comprise any type or configuration of bi-directional electronic communication device that is or becomes known or practicable. The transceiver device 712 may, for example, comprise a Network Interface Card (NIC), a telephonic device, a cellular network device, a router, a hub, a modem, and/or a communications port or cable. In some embodiments, the transceiver device 712 may be coupled to provide data to a user device (not shown in FIG. 7), such as in the case that the apparatus 710 is utilized to provide a systemic resource utilization interface (e.g., the interface 720) to a user and/or to provide systemic resource utilization analysis, classification, and/or data processing results, such as based on systemic resource utilization sensor data, as described herein. The transceiver device 712 may, for example, comprise a cellular telephone network transmission device that sends signals indicative of systemic resource utilization data processing interface components and/or data processing result-based commands to a user handheld, mobile, and/or telephone device. According to some embodiments, the transceiver device 712 may also or alternatively be coupled to the processing device 714. In some embodiments, the transceiver device 712 may comprise an IR, RF, Bluetooth™ and/or Wi-Fi® network device coupled to facilitate communications between the processing device 714 and another device (such as a user device and/or a third-party device; not shown in FIG. 7).

According to some embodiments, the processing device 714 may be or include any type, quantity, and/or configuration of electronic and/or computerized processor that is or becomes known. The processing device 714 may comprise, for example, an Intel® IXP 2800 network processor or an Intel® XEON™ Processor coupled with an Intel® E7501 chipset. In some embodiments, the processing device 714 may comprise multiple, cooperative, and/or inter-connected processors, microprocessors, and/or micro-engines (e.g., a computational processing device and/or server cluster). According to some embodiments, the processing device 714 (and/or the apparatus 710 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 710 comprises a server such as a blade server, necessary power may be supplied via a standard AC outlet, power strip, surge protector, a PDU, and/or Uninterruptible Power Supply (UPS) device (none of which are shown in FIG. 7).

In some embodiments, the input device 716 and/or the output device 718 are communicatively coupled to the processing device 714 (e.g., via wired and/or wireless connections and/or pathways) and they may generally comprise any types or configurations of input and output components and/or devices that are or become known, respectively. The input device 716 may comprise, for example, a keyboard that allows an operator of the apparatus 710 to interface with the apparatus 710 (e.g., by a user, such as an insurance company analyzing and processing systemic resource utilization data, as described herein). The output device 718 may, according to some embodiments, comprise a display screen and/or other practicable output component and/or device. The output device 718 may, for example, provide an augmented reality interface such as the interface 720 to a user (e.g., via a website). In some embodiments, the interface 720 may comprise portions and/or components of either or both of the input device 716 and the output device 718. According to some embodiments, the input device 716 and/or the output device 718 may, for example, comprise and/or be embodied in an input/output and/or single device such as a touch-screen monitor or display (e.g., that enables both input and output via the interface 720).

In some embodiments, the apparatus 710 may comprise the cooling device 730. According to some embodiments, the cooling device 730 may be coupled (physically, thermally, and/or electrically) to the processing device 714 and/or to the memory device 740. The cooling device 730 may, for example, comprise a fan, heat sink, heat pipe, radiator, cold plate, and/or other cooling component or device or combinations thereof, configured to remove heat from portions or components of the apparatus 710.

The memory device 740 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of systemic analysis classification algorithm instructions 742-1, competition instructions 742-2, interface instructions 742-3, sensor data 744-1, structure data 744-2, competition data 744-3, incentive data 744-4, account data 744-5, and/or leaderboard data 744-6. In some embodiments, the systemic analysis classification algorithm instructions 742-1, competition instructions 742-2, interface instructions 742-3, sensor data 744-1, structure data 744-2, competition data 744-3, incentive data 744-4, account data 744-5, and/or leaderboard data 744-6 may be utilized by the processing device 714 to provide output information via the output device 718 and/or the transceiver device 712.

According to some embodiments, the systemic analysis classification algorithm instructions 742-1 may be operable to cause the processing device 714 to process sensor data 744-1, structure data 744-2, competition data 744-3, incentive data 744-4, account data 744-5, and/or leaderboard data 744-6. Sensor data 744-1, structure data 744-2, competition data 744-3, incentive data 744-4, account data 744-5, and/or leaderboard data 744-6 received via the input device 716 and/or the transceiver device 712 may, for example, be analyzed, sorted, filtered, decoded, decompressed, ranked, scored, plotted, and/or otherwise processed by the processing device 714 in accordance with the systemic analysis classification algorithm instructions 742-1. In some embodiments, sensor data 744-1, structure data 744-2, competition data 744-3, incentive data 744-4, account data 744-5, and/or leaderboard data 744-6 may be fed (e.g., input) by the processing device 714 through one or more mathematical and/or statistical formulas and/or models in accordance with the systemic analysis classification algorithm instructions 742-1 to identify, computer, calculate, define, and/or otherwise determine a data pattern, mathematical trend, fit, and/or model that represents systemic resource utilization for one or more structures, in accordance with embodiments described herein.

In some embodiments, the competition instructions 742-2 may be operable to cause the processing device 714 to process sensor data 744-1, structure data 744-2, competition data 744-3, incentive data 744-4, account data 744-5, and/or leaderboard data 744-6. Sensor data 744-1, structure data 744-2, competition data 744-3, incentive data 744-4, account data 744-5, and/or leaderboard data 744-6 received via the input device 716 and/or the transceiver device 712 may, for example, be analyzed, sorted, filtered, decoded, decompressed, ranked, scored, plotted, and/or otherwise processed by the processing device 714 in accordance with the competition instructions 742-2. In some embodiments, sensor data 744-1, structure data 744-2, competition data 744-3, incentive data 744-4, account data 744-5, and/or leaderboard data 744-6 may be fed (e.g., input) by the processing device 714 through one or more mathematical and/or statistical formulas and/or models in accordance with the competition instructions 742-2 to facilitate, conduct, execute, and/or manage a competition, game, and/or tournament based on systemic resource utilization data, in accordance with embodiments described herein.

According to some embodiments, the interface instructions 742-3 may be operable to cause the processing device 714 to process sensor data 744-1, structure data 744-2, competition data 744-3, incentive data 744-4, account data 744-5, and/or leaderboard data 744-6. Sensor data 744-1, structure data 744-2, competition data 744-3, incentive data 744-4, account data 744-5, and/or leaderboard data 744-6 received via the input device 716 and/or the transceiver device 712 may, for example, be analyzed, sorted, filtered, decoded, decompressed, ranked, scored, plotted, and/or otherwise processed by the processing device 714 in accordance with the interface instructions 742-3. In some embodiments, sensor data 744-1, structure data 744-2, competition data 744-3, incentive data 744-4, account data 744-5, and/or leaderboard data 744-6 may be fed (e.g., input) by the processing device 714 through one or more mathematical and/or statistical formulas and/or models in accordance with the interface instructions 742-3 to define, generate, provide, and/or output an interface operable to receive user feedback regarding systemic resource utilization data readings and/or to provide one or more leaderboards or other competitive and/or incentive-related outputs to the user, in accordance with embodiments described herein.

Any or all of the exemplary instructions 742 and data types 744 described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated). According to some embodiments, the apparatus 710 may comprise a system and/or a portion of a system that may, for example, include additional devices and/or objects, local or remote, than are depicted in FIG. 7. The apparatus 710 may comprise, for example, a system for analyzing systemic resource utilization based on readings from a sensor coupled to measure such system readings, classifying systemic resource utilization, provide alerts and/or remedial action commands based on the classification results, and/or providing leaderboards, competitions, and/or incentives, based on systemic resource utilization and/or classification performance and/or compliance, as described herein.

Referring to FIG. 8A, FIG. 8B, FIG. 8C, FIG. 8D, and FIG. 8E, perspective diagrams of exemplary data storage devices 840*a-e* according to some embodiments are shown. The data storage devices 840*a-e* may, for example, be utilized to store instructions and/or data such as the systemic analysis classification algorithm instructions 742-1, competition instructions 742-2, interface instructions 742-3, sensor data 744-1, structure data 744-2, competition data 744-3, incentive data 744-4, account data 744-5, and/or leaderboard data 744-6, each of which is described in reference to FIG. 7 herein. In some embodiments, instructions stored on the data storage devices 840*a-e* may, when executed by one or more threads, cores, and/or processors (such as the processing device 714 of FIG. 7), cause the implementation of and/or facilitate the method 300 described in conjunction with FIG. 3 herein, and/or portions thereof.

According to some embodiments, a first data storage device 840*a* may comprise one or more various types of internal and/or external hard drives. The first data storage device 840*a* may, for example, comprise a data storage medium 846 that is read, interrogated, and/or otherwise communicatively coupled to and/or via a disk reading device 848. In some embodiments, the first data storage device 840*a* and/or the data storage medium 846 may be configured to store information utilizing one or more magnetic, inductive, and/or optical means (e.g., magnetic, inductive, and/or optical-encoding). The data storage medium 846, depicted as a first data storage medium 846*a* for example (e.g., breakout cross-section "A"), may comprise one or more of a polymer layer 846*a*-1, a magnetic data storage layer 846*a*-2, a non-magnetic layer 846*a*-3, a magnetic base layer 846*a*-4, a contact layer 846*a*-5, and/or a substrate layer 846*a*-6. According to some embodiments, a magnetic read head 846*a* may be coupled and/or disposed to read data from the magnetic data storage layer 846*a*-2.

In some embodiments, the data storage medium 846, depicted as a second data storage medium 846*b* for example (e.g., breakout cross-section "B"), may comprise a plurality of data points 846*b*-2 disposed with the second data storage medium 846*b*. The data points 846*b*-2 may, in some embodiments, be read and/or otherwise interfaced with via a laser-enabled read head 848*b* disposed and/or coupled to direct a laser beam through the second data storage medium 846*b*.

In some embodiments, a second data storage device 840*b* may comprise a CD, CD-ROM, DVD, Blu-Ray™ Disc, and/or other type of optically-encoded disk and/or other storage medium that is or becomes know or practicable. In some embodiments, a third data storage device 840*c* may comprise a USB keyfob, dongle, and/or other type of flash memory data storage device that is or becomes know or practicable. In some embodiments, a fourth data storage device 840*d* may comprise RAM of any type, quantity, and/or configuration that is or becomes practicable and/or desirable. In some embodiments, the fourth data storage device 840*d* may comprise an off-chip cache such as a Level 2 (L2) cache memory device. According to some embodiments, a fifth data storage device 840*e* may comprise an on-chip memory device such as a Level 1 (L1) cache memory device.

The data storage devices 840*a-e* may generally store program instructions, code, and/or modules that, when executed by a processing device cause a particular machine to function in accordance with one or more embodiments described herein. The data storage devices 840*a-e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined herein and includes many exemplary protocols that are also applicable here.

VII. Terms and Rules of Interpretation

Throughout the description herein and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with "systemic" data, measurements, and/or utilization. As utilized herein, the term "systemic" may generally be descriptive of a totality and/or overall measure for a particular item or object, such as is measurable at a particular or single point or location. In the context of resource utilization by (or in) a structure, for example, a "systemic" measure of the usage may generally be descriptive of a total amount of usage for the structure.

Some embodiments described herein are associated with "real time" and/or "near-real time" events or occurrences. As utilized herein, the term "real time" may generally refer to and/or be descriptive of an occurrence of an event or activity at a time that is significantly proximate to a previous and/or triggering event or occurrence. In the context of online environment transactions and/or calculations, for example, a real-time occurrence of a calculation may be considered to occur in "real time" with respect to a receiving of an input required for the calculation in the case that the calculation occurs within ten (10) seconds of the receiving of the input. In some embodiments, "real-time" may refer to an occurrence that is effectuate and/or produces results in one (1) minute or less. "Near-real time" may generally refer to and/or be descriptive of an occurrence of an event or activity at a time that is proximate to a previous and/or triggering event or occurrence. Real time events or occurrences are generally more proximate to a previous event than "near-real time" events or occurrences. With reference to the non-limiting examples presented above, for example, while real time may equate to less than one (1) minute or less than ten (10) seconds, a corresponding "near-real time" event may occur greater than one (1) minute but less than three (3) minutes or greater than ten (10) seconds but less than thirty (30) seconds, respectively.

Some embodiments described herein are associated with a "module". As utilized herein, the term "module" may generally be descriptive of any combination of hardware, electronic circuitry and/or other electronics (such as logic chips, logical gates, and/or other electronic circuit elements or components), hardware (e.g., physical devices such as hard disks, solid-state memory devices, and/or computer components such as processing units or devices), firmware, and/or software or microcode.

Some embodiments described herein are associated with a "user device", a "remote device", or a "network device". As used herein, each of a "user device" and a "remote device" is a subset of a "network device". The "network device", for example, may generally refer to any device that can communicate via a network, while the "user device" may comprise a network device that is owned and/or operated by or otherwise associated with a particular user (and/or group of users—e.g., via shared login credentials and/or usage rights), and while a "remote device" may generally comprise a device remote from a primary device or system component and/or may comprise a wireless and/or portable network device. Examples of user, remote, and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. User, remote, and/or network devices may, in some embodiments, comprise one or more network components.

As used herein, the term "network component" may refer to a user, remote, or network device, or a component, piece, portion, or combination of user, remote, or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination In some embodiments, one or more specialized machines such as a computerized processing device, a server, a remote terminal, and/or a customer device may implement the various practices described herein. A computer system of an insurance quotation and/or risk analysis processing enterprise may, for example, comprise various specialized computers that interact to analyze, process, and/or transform data in a modular fashion as described herein. In some embodiments, such modular data processing may provide various advantages such as reducing the number and/or frequency of data calls to data storage devices, which may accordingly increase processing speeds for instances of data processing model executions. As the modular approach detailed herein also allows for storage of a single, modular set of programming code as opposed to multiple complete version of code having variance therein, the taxation on memory resources for a data processing system may also be reduced.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled, but not claimed in the present application.

What is claimed is:

1. A method for detecting a leak in a conduit network of a structure utilizing a systemic analysis algorithm, comprising:
receiving, at each of multiple points in time during a period of time, from a router associated with the structure, by an electronic communications device, and via an electronic network, a data certificate comprising data descriptive of (i) an identifier of a sensor and (ii) a reading from the sensor, the sensor being installed to take the reading with respect to a resource that passes through a single point of the conduit network and the reading being descriptive of the resource that has passed through the single point of the conduit network;
storing, by a non-transitory memory device, and for each of the multiple points in time during the period of time, and in relation to the identifier of the sensor, the data descriptive of the reading from the sensor;
computing, by a central processing device and by executing a systemic analysis algorithm stored by the non-transitory memory device, and utilizing as inputs to the systemic analysis algorithm the stored data descriptive of the readings from the sensor during the period of time, a classification of the resource that has passed through the single point of the conduit network during the period of time; and
transmitting, by the electronic communications device and to a remote receiver device, and in response to the classification of the resource that has passed through the single point of the conduit network during the period of time, an indication of the classification of the resource that has passed through the single point of the conduit network during the period of time.

2. The method of claim 1, wherein the indication of the classification of the resource that has passed through the single point of the conduit network during the period of time that is transmitted to the remote receiver device comprises an alert that there is abnormal usage of the resource that has passed through the single point of the conduit network.

3. The method of claim 1, wherein the remote receiver device comprises a mobile electronic device in communication with the router.

4. The method of claim 3, further comprising:
outputting, by an application executed by the mobile electronic device, in response to the indication of the classification of the resource that has passed through the single point of the conduit network during the period of time, and via an output device of the mobile electronic device, an indication of an alert.

5. The method of claim 3, further comprising:
outputting, by an application executed by the mobile electronic device, in response to the indication of the classification of the resource that has passed through the single point of the conduit network during the period of time, and via an output device of the mobile electronic device, an indication of a leaderboard.

6. The method of claim 5, further comprising:
comparing, by the central processing device, the classification of the resource that has passed through the single point of the conduit network during the period of time to classifications of resources from other comparable structures for the period of time;
ranking, by the central processing device, and based on the comparison, the structures; and
generating, by the central processing device and based on the ranking, the leaderboard.

7. The method of claim 1, wherein the remote receiver device comprises the router, and the indication of the classification of the resource that has passed through the single point of the conduit network during the period of time that is transmitted to the router comprises a command to close a valve installed proximate to the single point of the conduit network.

8. The method of claim 1, wherein the single point of the conduit network comprises at least one of a main potable water service inlet, a main air duct supply, a main air duct return, a main electrical service supply, a main gas service inlet, a main sewer outflow, a main septic outflow, and a main drainage outflow.

9. The method of claim 1, wherein the systemic analysis algorithm comprises a pattern analysis algorithm.

10. The method of claim 1, wherein the classification comprises a categorization of the resource that has passed through the single point of the conduit network during the period of time as one of: (i) normal; and (ii) abnormal.

11. The method of claim 1, wherein the computing comprises a comparison of the stored data descriptive of the readings from the sensor during the period of time to readings from a different sensor of a different structure recorded during a different period of time having the same length as the period of time.

12. The method of claim 1, wherein the sensor comprises at least one of a temperature sensor, a pressure sensor, a flow meter, a humidity sensor, a vibration sensor, and a flow depth sensor.

13. The method of claim 1, further comprising:

computing, by the central processing device and by executing a loss prediction algorithm stored in the non-transitory memory device, and utilizing as inputs to the loss prediction algorithm at least one of (i) the classification of the resource that has passed through the single point of the conduit network during the period of time, and (ii) the stored data descriptive of the readings from the sensor during the period of time, a likelihood of damage for the structure.

14. The method of claim 13, further comprising:

transmitting, by the electronic communications device and to the remote receiver device, and in response to the computed likelihood of damage for the structure, a command to close a valve coupled to govern flow of the resource through the single point of the conduit network.

15. The method of claim 1, further comprising:

computing, by the central processing device and based at least in part on the classification of the resource that has passed through the single point of the conduit network during the period of time, an amount of credits earned for the structure.

16. The method of claim 15, further comprising:

transmitting, by the electronic communications device and to the remote receiver device, an indication of the amount of credits earned for the structure.

17. The method of claim 15, wherein the amount of credits comprises an amount of green energy credits.

18. The method of claim 15, wherein the amount of credits comprises an amount of a discount to a premium of an insurance policy that covers the structure.

* * * * *